United States Patent
Tsikata et al.

(10) Patent No.: US 11,049,227 B2
(45) Date of Patent: Jun. 29, 2021

(54) IMAGE ADJUSTMENT AND STANDARDIZATION

(71) Applicant: Massachusetts Eye and Ear Infirmary, Boston, MA (US)

(72) Inventors: Edem Tsikata, Cambridge, MA (US); Teresa C. Chen, Boston, MA (US); Ines Maria de Carvalho Lains, Cambridge, MA (US); Deeba Husain, Lexington, MA (US); John Miller, Winchester, MA (US)

(73) Assignee: Massachusetts Eye & Ear Infirmary, Boston, MA (US)

( * ) Notice: Subject to any disclaimer, the term of this patent is extended or adjusted under 35 U.S.C. 154(b) by 0 days.

(21) Appl. No.: 16/490,853

(22) PCT Filed: Mar. 5, 2018

(86) PCT No.: PCT/US2018/020920
§ 371 (c)(1),
(2) Date: Sep. 3, 2019

(87) PCT Pub. No.: WO2018/161078
PCT Pub. Date: Sep. 7, 2018

(65) Prior Publication Data
US 2019/0385287 A1 Dec. 19, 2019

Related U.S. Application Data

(60) Provisional application No. 62/467,078, filed on Mar. 3, 2017.

(51) Int. Cl.
*G06T 5/00* (2006.01)

(52) U.S. Cl.
CPC .... *G06T 5/009* (2013.01); *G06T 2207/10024* (2013.01); *G06T 2207/20208* (2013.01); *G06T 2207/30041* (2013.01)

(58) Field of Classification Search
CPC .......... G06T 5/009; G06T 2207/10024; G06T 2207/20208; G06T 2207/30041
See application file for complete search history.

(56) References Cited

U.S. PATENT DOCUMENTS 5,999,639 A * 12/1999 Rogers ..................... B25J 15/04
382/132
9,135,698 B2 * 9/2015 Robitaille .......... G01R 33/5608

OTHER PUBLICATIONS

PCT International Preliminary Report on Patentability in International Application No. PCT/US2018/020920, dated Sep. 12, 2019, 10 Pages.

(Continued)

*Primary Examiner* — Antonio A Caschera
(74) *Attorney, Agent, or Firm* — Fish & Richardson P.C.

(57) ABSTRACT

The disclosure features methods and systems that include: obtaining an input image of an imaging subject, where the input image is a color image featuring, in each of multiple color channels, a first set of pixel intensity values; for each one of the multiple color channels, determining a measured contrast value and a measured brightness value from the first set of pixel intensity values for the color channel, determining a contrast ratio for the color channel based on a target contrast value for the color channel and the measured contrast value for the color channel, and generating a second set of pixel intensity values for the color channel; and generating an output image of the imaging subject based on the second sets of pixel intensity values for each of the multiple color channels.

42 Claims, 8 Drawing Sheets

(56) References Cited

OTHER PUBLICATIONS

PCT International Search Report and Written Opinion in International Application No. PCT/US2018/020920, dated May 15, 2018, 16 Pages.
Quadrado et al., "A standardized automated method for color balance and contrast of AMO color fundus photographs", Sep. 10, 2016, retrieved on Apr. 26, 2018, <<http://euretina.org/copenhagen2016/programme/free-papersdetails.asp?id=4737&day=0>>, 2 pages.
Reinhard et al., "Color Transfer Between Images," IEEE Computer Graphics and Applications, Sep./Oct. 2001, 21(5):34-41.
Rosas-Romero et al., "A method to assist in the diagnosis of early diabetic retinopathy: Image processing applied to detection of microaneurysms in fundus images," Computerized Medical Imaging and Graphics, Sep. 2015, 44:41-53.
Švihlík et al., "Color normalization for robust evaluation of microscopy images," Applications of Digital Image Processing, Sep. 2015, 9599:95992F, 6 Pages.
Tsikata et al., "Automated Brightness and Contrast Adjustment of Color Fundus Photographs for the Grading of Age-Related Macular Degeneration," Translational Vision Science & Technology, Mar. 2017, 6(2): 3, 13 pages.

\* cited by examiner

IMAGE ADJUSTMENT AND STANDARDIZATION

CROSS-REFERENCE TO RELATED APPLICATIONS

This application is a national stage application of International Application No. PCT/US2018/020920, filed on Mar. 5, 2018, which claims priority to U.S. Provisional Patent Application No. 62/467,078, filed on Mar. 3, 2017. The entire contents of each of the foregoing applications are incorporated herein by reference.

TECHNICAL FIELD

This disclosure relates to analysis of images and standardization of images for comparative analysis and digital libraries.

BACKGROUND

Digital images are widely used for a variety of analytic, diagnostic, and information capturing applications. Images captured under different conditions and/or with different imaging systems can exhibit variability due to the specific conditions and equipment used, i.e., variations that may not accurately reflect the nature of the subject or scene that is imaged. Manual adjustment of digital images is subject to the skill of human operators and consequently, corrections to images may not be applied uniformly. This can cause problems when such images are used for archival and/or diagnostic applications.

SUMMARY

The present disclosure features methods and systems for standardizing digital images for use in a variety of applications. For example, standardized images of ocular tissue can be used in the diagnosis of a variety of diseases, including age-related macular degeneration (AMD), glaucoma, diabetic retinopathy, and retinopathy of prematurity (ROP). The methods can be used to ensure that images obtained at different locations, using different imaging systems, and/or under different imaging conditions, can nonetheless be stored, evaluated, and analyzed based on common criteria. Thus, for example, images used to diagnose a particular disease state can be transformed according to target brightness and contrast values in a specific set of color channels. The target values can be individually customized or can be selected based on clinical trials to provide favorable diagnostic information for particular disease states.

In a first aspect, the disclosure features methods that include obtaining an input image of an imaging subject, where the input image is a color image that includes, in each of multiple color channels, a first set of pixel intensity values; for each one of the multiple color channels: determining a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determining a contrast ratio for the color channel based on a target contrast value for the color channel and the measured contrast value for the color channel, and generating a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generating an output image of the imaging subject based on the second set of pixel intensity values for each of the multiple color channels, where in the output image, differences between measured brightness values for each of the color channels and the corresponding target brightness values for each of the color channels are smaller in magnitude than differences between the measured brightness values for each of the color channels from the first set of pixel intensity values and the corresponding target brightness values.

Embodiments of the methods can include any one or more of the following features.

In the output image, differences between measured contrast values for each of the color channels and the corresponding target contrast values for each of the color channels can be smaller in magnitude than differences between the measured contrast values for each of the color channels from the first set of pixel intensity values and the corresponding target contrast values.

The methods can include displaying the output image on a display device. The output image can be an image associated with a disease condition, and the methods can include obtaining calibration information associated with the disease condition and featuring the target brightness and contrast values for at least one of the multiple color channels. The multiple color channels can include red, green, and blue color channels. The multiple color channels can include cyan, magenta, yellow, and black color channels. The multiple color channels can include intensity, blue chrominance, and red chrominance color channels. The multiple color channels can include an intensity channel and two chrominance channels. The multiple color channels can include a hue channel, a luminance channel, and a saturation channel. The multiple color channels can include a lightness channel and two color opponent dimension color channels.

The first set of pixel intensity values can be derived from a subset of pixels of the input image. The methods can include, for each one of the color channels, determining the measured contrast value for the color channel based on a standard deviation of the distribution of the first set of pixel intensity values for the color channel. The methods can include, for each one of the color channels, determining the measured contrast value for the color channel as a multiple of the standard deviation of the distribution of the first set of pixel intensity values for the color channel.

The methods can include, for each one of the color channels, generating each pixel intensity value in the second set of pixel intensity values by adding, to the scaled corresponding pixel intensity value, a product of the measured brightness value for the color channel and the contrast ratio.

In the output image, the magnitudes of the differences between the measured brightness values for each of the color channels and the corresponding target brightness values for each of the color channels can be less than 10% (e.g., less than 5%) of the target brightness values. In the output image, the magnitudes of the differences between the measured contrast values for each of the color channels and the corresponding target contrast values for each of the color channels can be less than 25% (e.g., less than 10%) of the target contrast values.

The methods can include obtaining the calibration information associated with the disease condition and featuring the target brightness and contrast values by: (i) obtaining a calibration image that includes information corresponding to the disease condition in the multiple color channels, the information featuring the first set of pixel intensity values; (ii) for at least some of the multiple color channels in the calibration image: selecting the target brightness value and the target contrast value for the at least some color channels; generating the second set of pixel intensity values from the first set of pixel intensity values; (iii) generating a calibration output image based on the second set of pixel intensity values; and (iv) determining whether to include the target brightness value and the target contrast value in the calibration information based on the calibration output image.

The disease condition can include retinopathy of prematurity, and the calibration information can include target brightness values of between 154 and 186 in a red color channel, between 118 and 150 in a green color channel, and between 93 and 125 in a blue color channel, for a range of possible target brightness values of between 0 and 255. The calibration information can include target contrast values of between 188 and 220 in a red color channel, between 112 and 144 in a green color channel, and between 40 and 72 in a blue color channel, for a range of possible target contrast values of between 0 and 255.

The disease condition can include glaucoma, and the calibration information can include target brightness values of between 134 and 166 in a red color channel, between 59 and 91 in a green color channel, and between 21 and 53 in a blue color channel, for a range of possible target brightness values of between 0 and 255. The calibration information can include target contrast values of between 64 and 96 in a red color channel, between 64 and 96 in a green color channel, and between 64 and 96 in a blue color channel, for a range of possible target contrast values of between 0 and 255.

The disease condition can include diabetic retinopathy, and the calibration information can include target brightness values of between 176 and 208 in a red color channel, between 80 and 112 in a green color channel, and between 16 and 48 in a blue color channel, for a range of possible target brightness values of between 0 and 255. The calibration information can include target contrast values of between 112 and 144 in a red color channel, between 112 and 144 in a green color channel, and between 16 and 48 in a blue color channel, for a range of possible target contrast values of between 0 and 255.

The disease condition can include age-related macular degeneration, and the calibration information can include target brightness values of between 176 and 208 in a red color channel, between 80 and 112 in a green color channel, and between 16 and 48 in a blue color channel, for a range of possible target brightness values of between 0 and 255. The calibration information can include target contrast values of between 112 and 144 in a red color channel, between 112 and 144 in a green color channel, and between 16 and 48 in a blue color channel, for a range of possible target contrast values of between 0 and 255.

The disease condition can include drusen, and the calibration information can include target brightness values of between 176 and 208 in a red color channel, between 80 and 112 in a green color channel, and between 16 and 48 in a blue color channel, for a range of possible target brightness values of between 0 and 255. The calibration information can include target contrast values of between 112 and 144 in a red color channel, between 112 and 144 in a green color channel, and between 16 and 48 in a blue color channel, for a range of possible target contrast values of between 0 and 255.

The disease condition can include choroidal lesions, and the calibration information can include target brightness values of between 176 and 208 in a red color channel, between 80 and 112 in a green color channel, and between 16 and 48 in a blue color channel, for a range of possible target brightness values of between 0 and 255. The calibration information can include target contrast values of between 112 and 144 in a red color channel, between 112 and 144 in a green color channel, and between 16 and 48 in a blue color channel, for a range of possible target contrast values of between 0 and 255.

The imaging subject can include ocular tissue, and the methods can include diagnosing a disease condition in a patient based on the output image.

Methods for generating a library of image information can include storing image information derived from a plurality of images in a storage unit, where each of the plurality of images is an output image generated according to any of the foregoing methods and combinations of method steps, and where at least some of the plurality of images are generated from first images obtained from different detection systems.

Embodiments of the methods can also include any of the other features disclosed herein, including features disclosed in connection with different embodiments, in any combination except as expressly stated otherwise.

In another aspect, the disclosure features systems that include a detection apparatus configured to obtain an input image of an imaging subject, where the input image is a color image featuring, in each of multiple color channels, a first set of pixel intensity values; a display apparatus; and an electronic processor coupled to the detection apparatus and to the display apparatus, and configured to: receive the input image; for each one of the multiple color channels, determine a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determine a contrast ratio for the color channel based on a target contrast value for the color channel and the measured contrast value for the color channel, and generate a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generate an output image of the imaging subject on the display apparatus based on the second set of pixel intensity values for each of the multiple color channels, where in the output image, differences between measured brightness values for each of the color channels and the corresponding target brightness values for each of the color channels are smaller in magnitude than differences between the measured brightness values for each of the color channels from the first set of pixel intensity values and the corresponding target brightness values.

Embodiments of the systems can include any one or more of the following features.

In the output image, differences between measured contrast values for each of the color channels and the corresponding target contrast values for each of the color channels can be smaller in magnitude than differences between the measured contrast values for each of the color channels from the first set of pixel intensity values and the corresponding target contrast values.

The output image can be an image associated with a disease condition, and the electronic processor can be configured to obtain calibration information associated with the disease condition and featuring the target brightness and contrast values for at least one of the multiple color channels.

The multiple color channels can include red, green, and blue color channels. The multiple color channels can include cyan, magenta, yellow, and black color channels. The multiple color channels can include intensity, blue chrominance, and red chrominance color channels. The multiple color channels can include an intensity channel and two chrominance channels. The multiple color channels can include a hue channel, a luminance channel, and a saturation channel. The multiple color channels can include a lightness channel and two color opponent dimension color channels.

The electronic processor can be configured to determine the first set of pixel intensity values from a subset of pixels of the input image. The electronic processor can be configured to determine, for each one of the color channels, the measured contrast value for the color channel based on a standard deviation of the distribution of the first set of pixel intensity values for the color channel. The electronic processor can be configured to determine, for each one of the color channels, the measured contrast value for the color channel as a multiple of the standard deviation of the distribution of the first set of pixel intensity values for the color channel.

The electronic processor can be configured to generate each pixel intensity value in the second set of pixel intensity values by adding, to the scaled corresponding pixel intensity value, a product of the measured brightness value for the color channel and the contrast ratio.

In the output image, the magnitudes of the differences between the measured brightness values for each of the color channels and the corresponding target brightness values for each of the color channels can be less than 10% (e.g., less than 5%) of the target brightness values. In the output image, the magnitudes of the differences between the measured contrast values for each of the color channels and the corresponding target contrast values for each of the color channels can be less than 25% (e.g., less than 10%) of the target contrast values.

The electronic processor can be configured to obtain the calibration information associated with the disease condition and comprising the target brightness and contrast values by: (i) obtaining a calibration image that includes information corresponding to the disease condition in the multiple color channels, the information featuring the first set of pixel intensity values; (ii) for at least some of the multiple color channels in the calibration image, selecting the target brightness value and the target contrast value for the at least some color channels, and generating the second set of pixel intensity values from the first set of pixel intensity values; (iii) generating a calibration output image based on the second set of pixel intensity values; and (iv) determining whether to include the target brightness value and the target contrast value in the calibration information based on the calibration output image.

The disease condition can include retinopathy of prematurity, and the calibration information can include target brightness values of between 154 and 186 in a red color channel, between 118 and 150 in a green color channel, and between 93 and 125 in a blue color channel, for a range of possible target brightness values of between 0 and 255. The calibration information can include target contrast values of between 188 and 220 in a red color channel, between 112 and 144 in a green color channel, and between 40 and 72 in a blue color channel, for a range of possible target contrast values of between 0 and 255.

The disease condition can include glaucoma, and the calibration information can include target brightness values of between 134 and 166 in a red color channel, between 59 and 91 in a green color channel, and between 21 and 53 in a blue color channel, for a range of possible target brightness values of between 0 and 255. The calibration information can include target contrast values of between 64 and 96 in a red color channel, between 64 and 96 in a green color channel, and between 64 and 96 in a blue color channel, for a range of possible target contrast values of between 0 and 255.

The disease condition can include diabetic retinopathy, and the calibration information can include target brightness values of between 176 and 208 in a red color channel, between 80 and 112 in a green color channel, and between 16 and 48 in a blue color channel, for a range of possible target brightness values of between 0 and 255. The calibration information can include target contrast values of between 112 and 144 in a red color channel, between 112 and 144 in a green color channel, and between 16 and 48 in a blue color channel, for a range of possible target contrast values of between 0 and 255.

The disease condition can include age-related macular degeneration, and the calibration information can include target brightness values of between 176 and 208 in a red color channel, between 80 and 112 in a green color channel, and between 16 and 48 in a blue color channel, for a range of possible target brightness values of between 0 and 255. The calibration information can include target contrast values of between 112 and 144 in a red color channel, between 112 and 144 in a green color channel, and between 16 and 48 in a blue color channel, for a range of possible target contrast values of between 0 and 255.

The disease condition can include drusen, and the calibration information can include target brightness values of between 176 and 208 in a red color channel, between 80 and 112 in a green color channel, and between 16 and 48 in a blue color channel, for a range of possible target brightness values of between 0 and 255. The calibration information can include target contrast values of between 112 and 144 in a red color channel, between 112 and 144 in a green color channel, and between 16 and 48 in a blue color channel, for a range of possible target contrast values of between 0 and 255.

The disease condition can include choroidal lesions, and the calibration information can include target brightness values of between 176 and 208 in a red color channel, between 80 and 112 in a green color channel, and between 16 and 48 in a blue color channel, for a range of possible target brightness values of between 0 and 255. The calibration information can include target contrast values of between 112 and 144 in a red color channel, between 112 and 144 in a green color channel, and between 16 and 48 in a blue color channel, for a range of possible target contrast values of between 0 and 255.

Embodiments of the systems can also include any of the other features disclosed herein, including features disclosed in connection with different embodiments, in any combination except as expressly stated otherwise.

In a further aspect, the disclosure features methods of generating an output image for retinopathy of prematurity assessment, the methods including: obtaining an input image showing at least a portion of a fundus of an imaging subject, where the input image includes, in each of red, green, and blue color channels, a first set of pixel intensity values; for each one of the color channels, determining a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determining a contrast ratio for the color channel based on a target contrast value for the color channel and the measured contrast value for the color channel, and generating a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generating an output image of the imaging subject based on the second set of pixel intensity values for each of the red, green, and blue color channels, where the target brightness value for the red color channel is between 154 and 186 for a range of possible target brightness values of between 0 and 255, where the target brightness value for the green color channel is between 118 and 150 for a range of possible target brightness values of between 0 and 255, and where the target brightness value for the blue color channel is between 93 and 125 for a range of possible target brightness values of between 0 and 255.

The target contrast value for the red color channel can be between 188 and 220 for a range of possible target contrast values of between 0 and 255, the target contrast value for the green color channel can be between 112 and 144 for a range of possible target contrast values of between 0 and 255, and the target contrast value for the blue color channel can be between 40 and 72 for a range of possible target contrast values of between 0 and 255.

Embodiments of the methods can also include any of the other features disclosed herein, including features disclosed in connection with different embodiments, in any combination except as expressly stated otherwise.

In another aspect, the disclosure features systems for generating an output image for retinopathy of prematurity assessment, the systems including a detection apparatus configured to obtain an input image showing at least a portion of a fundus of an imaging subject, where the input image includes, in each of red, green, and blue color channels, a first set of pixel intensity values, a display apparatus, and an electronic processor coupled to the detection apparatus and to the display apparatus, and configured to: receive the input image; for each one of the multiple color channels, determine a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determine a contrast ratio for the color channel based on a target contrast value for the color channel and the measured contrast value for the color channel, and generate a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel, and generate an output image of the imaging subject on the display apparatus based on the second set of pixel intensity values for each of the red, green, and blue color channels, wherein the target brightness value for the red color channel is between 154 and 186 for a range of possible target brightness values of between 0 and 255, the target brightness value for the green color channel is between 118 and 150 for a range of possible target brightness values of between 0 and 255, and the target brightness value for the blue color channel is between 93 and 125 for a range of possible target brightness values of between 0 and 255.

The target contrast value for the red color channel can be between 188 and 220 for a range of possible target contrast values of between 0 and 255, the target contrast value for the green color channel can be between 112 and 144 for a range of possible target contrast values of between 0 and 255, and the target contrast value for the blue color channel can be between 40 and 72 for a range of possible target contrast values of between 0 and 255.

Embodiments of the systems can also include any of the other features disclosed herein, including features disclosed in connection with different embodiments, in any combination except as expressly stated otherwise.

In a further aspect, the disclosure features methods of generating an output image for glaucoma assessment, the methods including obtaining an input image showing at least a portion of a fundus of an imaging subject, where the input image comprises, in each of red, green, and blue color channels, a first set of pixel intensity values; for each one of the color channels: determining a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel; determining a contrast ratio for the color channel based on a target contrast value for the color channel and the measured contrast value for the color channel; and generating a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generating an output image of the imaging subject based on the second set of pixel intensity values for each of the red, green, and blue color channels, where the target brightness value for the red color channel is between 134 and 166 for a range of possible target brightness values of between 0 and 255, where the target brightness value for the green color channel is between 59 and 91 for a range of possible target brightness values of between 0 and 255; and where the target brightness value for the blue color channel is between 21 and 53 for a range of possible target brightness values of between 0 and 255.

The target contrast value for the red color channel can be between 64 and 96 for a range of possible target contrast values of between 0 and 255, the target contrast value for the green color channel can be between 64 and 96 for a range of possible target contrast values of between 0 and 255, and the target contrast value for the blue color channel can be between 64 and 96 for a range of possible target contrast values of between 0 and 255.

Embodiments of the systems can also include any of the other features disclosed herein, including features disclosed in connection with different embodiments, in any combination except as expressly stated otherwise.

In another aspect, the disclosure features systems for generating an output image for glaucoma assessment, the systems including a detection apparatus configured to obtain an input image showing at least a portion of a fundus of an imaging subject, where the input image includes, in each of red, green, and blue color channels, a first set of pixel intensity values, a display apparatus, and an electronic processor coupled to the detection apparatus and to the display apparatus, and configured to: receive the input image; for each one of the multiple color channels, determine a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determine a contrast ratio for the color channel based on a target contrast value for the color channel and the measured contrast value for the color channel, and generate a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generate an output image of the imaging subject on the display apparatus based on the second set of pixel intensity values for each of the red, green, and blue color channels, where the target brightness value for the red color channel is between 134 and 166 for a range of possible target brightness values of between 0 and 255, where the target brightness value for the green color channel is between 59 and 91 for a range of possible target brightness values of between 0 and 255, and where the target brightness value for the blue color channel is between 21 and 53 for a range of possible target brightness values of between 0 and 255.

The target contrast value for the red color channel can be between 64 and 96 for a range of possible target contrast values of between 0 and 255, the target contrast value for the green color channel can be between 64 and 96 for a range of possible target contrast values of between 0 and 255, and the target contrast value for the blue color channel can be between 64 and 96 for a range of possible target contrast values of between 0 and 255.

Embodiments of the systems can also include any of the other features disclosed herein, including features disclosed in connection with different embodiments, in any combination except as expressly stated otherwise.

In a further aspect, the disclosure features methods of generating an output image for diabetic retinopathy assessment, the methods including: obtaining an input image showing at least a portion of a fundus of an imaging subject, where the input image includes, in each of red, green, and blue color channels, a first set of pixel intensity values: for each one of the color channels, determining a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determining a contrast ratio for the color channel based on a target contrast value for the color channel and the measured contrast value for the color channel, and generating a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generating an output image of the imaging subject based on the second set of pixel intensity values for each of the red, green, and blue color channels, where the target brightness value for the red color channel is between 176 and 208 for a range of possible target brightness values of between 0 and 255, where the target brightness value for the green color channel is between 80 and 112 for a range of possible target brightness values of between 0 and 255, and where the target brightness value for the blue color channel is between 16 and 48 for a range of possible target brightness values of between 0 and 255.

The target contrast value for the red color channel can be between 112 and 144 for a range of possible target contrast values of between 0 and 255, the target contrast value for the green color channel can be between 112 and 144 for a range of possible target contrast values of between 0 and 255, and the target contrast value for the blue color channel can be between 16 and 48 for a range of possible target contrast values of between 0 and 255.

Embodiments of the methods can also include any of the other features disclosed herein, including features disclosed in connection with different embodiments, in any combination except as expressly stated otherwise.

In another aspect, the disclosure features systems for generating an output image for diabetic retinopathy assessment, the systems including: a detection apparatus configured to obtain an input image showing at least a portion of a fundus of an imaging subject, where the input image includes, in each of red, green, and blue color channels, a first set of pixel intensity values; a display apparatus; and an electronic processor coupled to the detection apparatus and to the display apparatus, and configured to receive the input image, for each one of the multiple color channels, determine a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determine a contrast ratio for the color channel based on a target contrast value for the color channel and the measured contrast value for the color channel, and generate a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generate an output image of the imaging subject on the display apparatus based on the second set of pixel intensity values for each of the red, green, and blue color channels, where the target brightness value for the red color channel is between 176 and 208 for a range of possible target brightness values of between 0 and 255, where the target brightness value for the green color channel is between 80 and 112 for a range of possible target brightness values of between 0 and 255, and where the target brightness value for the blue color channel is between 16 and 48 for a range of possible target brightness values of between 0 and 255.

The target contrast value for the red color channel can be between 112 and 144 for a range of possible target contrast values of between 0 and 255, the target contrast value for the green color channel can be between 112 and 144 for a range of possible target contrast values of between 0 and 255, and the target contrast value for the blue color channel can be between 16 and 48 for a range of possible target contrast values of between 0 and 255.

Embodiments of the systems can also include any of the other features disclosed herein, including features disclosed in connection with different embodiments, in any combination except as expressly stated otherwise.

In a further aspect, the disclosure features methods of generating an output image for age-related macular degeneration assessment, the methods including: obtaining an input image showing at least a portion of a fundus of an imaging subject, where the input image includes, in each of red, green, and blue color channels, a first set of pixel intensity values; for each one of the color channels, determining a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determining a contrast ratio for the color channel based on a target contrast value for the color channel and the measured contrast value for the color channel, and generating a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generating an output image of the imaging subject based on the second set of pixel intensity values for each of the red, green, and blue color channels, where the target brightness value for the red color channel is between 176 and 208 for a range of possible target brightness values of between 0 and 255, where the target brightness value for the green color channel is between 80 and 112 for a range of possible target brightness values of between 0 and 255, and where the target brightness value for the blue color channel is between 16 and 48 for a range of possible target brightness values of between 0 and 255.

The target contrast value for the red color channel can be between 112 and 144 for a range of possible target contrast values of between 0 and 255, the target contrast value for the green color channel can be between 112 and 144 for a range of possible target contrast values of between 0 and 255, and the target contrast value for the blue color channel can be between 16 and 48 for a range of possible target contrast values of between 0 and 255.

Embodiments of the methods can also include any of the other features disclosed herein, including features disclosed in connection with different embodiments, in any combination except as expressly stated otherwise.

In another aspect, the disclosure features systems for generating an output image for age-related macular degeneration assessment, the systems including: a detection apparatus configured to obtain an input image showing at least a portion of a fundus of an imaging subject, where the input image comprises, in each of red, green, and blue color channels, a first set of pixel intensity values; a display apparatus; and an electronic processor coupled to the detection apparatus and to the display apparatus, and configured to: receive the input image; for each one of the multiple color channels, determine a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determine a contrast ratio for the color channel based on a target contrast value for the color channel and the measured contrast value for the color channel, and generate a second set of pixel intensity values for the color channel, where generating each pixel intensity value in the second set of pixel intensity values comprises scaling a corresponding pixel intensity value from the first set of pixel intensity values according to the contrast ratio for the color channel, and adding to the scaled corresponding pixel intensity value a target brightness value for the color channel; and generate an output image of the imaging subject on the display apparatus based on the second set of pixel intensity values for each of the red, green, and blue color channels, wherein the target brightness value for the red color channel is between 176 and 208 for a range of possible target brightness values of between 0 and 255, where the target brightness value for the green color channel is between 80 and 112 for a range of possible target brightness values of between 0 and 255, and where the target brightness value for the blue color channel is between 16 and 48 for a range of possible target brightness values of between 0 and 255.

The target contrast value for the red color channel can be between 112 and 144 for a range of possible target contrast values of between 0 and 255, the target contrast value for the green color channel can be between 112 and 144 for a range of possible target contrast values of between 0 and 255, and the target contrast value for the blue color channel can be between 16 and 48 for a range of possible target contrast values of between 0 and 255.

Embodiments of the systems can also include any of the other features disclosed herein, including features disclosed in connection with different embodiments, in any combination except as expressly stated otherwise.

In a further aspect, the disclosure features methods of generating an output image for drusen assessment, the methods including: obtaining an input image showing at least a portion of a fundus of an imaging subject, where the input image comprises, in each of red, green, and blue color channels, a first set of pixel intensity values; for each one of the color channels determining a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determining a contrast ratio for the color channel based on a target contrast value for the color channel and the measured contrast value for the color channel, and generating a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel, and generating an output image of the imaging subject based on the second set of pixel intensity values for each of the red, green, and blue color channels, where the target brightness value for the red color channel is between 176 and 208 for a range of possible target brightness values of between 0 and 255, where the target brightness value for the green color channel is between 80 and 112 for a range of possible target brightness values of between 0 and 255, and where the target brightness value for the blue color channel is between 16 and 48 for a range of possible target brightness values of between 0 and 255.

The target contrast value for the red color channel can be between 112 and 144 for a range of possible target contrast values of between 0 and 255, the target contrast value for the green color channel can be between 112 and 144 for a range of possible target contrast values of between 0 and 255, and the target contrast value for the blue color channel can be between 16 and 48 for a range of possible target contrast values of between 0 and 255.

Embodiments of the methods can also include any of the other features disclosed herein, including features disclosed in connection with different embodiments, in any combination except as expressly stated otherwise.

In another aspect, the disclosure features systems for generating an output image for drusen assessment, the systems including: a detection apparatus configured to obtain an input image showing at least a portion of a fundus of an imaging subject, where the input image includes, in each of red, green, and blue color channels, a first set of pixel intensity values; a display apparatus; and an electronic processor coupled to the detection apparatus and to the display apparatus, and configured to: receive the input image; for each one of the multiple color channels, determine a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determine a contrast ratio for the color channel based on a target contrast value for the color channel and the measured contrast value for the color channel, and generate a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generate an output image of the imaging subject on the display apparatus based on the second set of pixel intensity values for each of the red, green, and blue color channels, where the target brightness value for the red color channel is between 176 and 208 for a range of possible target brightness values of between 0 and 255, where the target brightness value for the green color channel is between 80 and 112 for a range of possible target brightness values of between 0 and 255, and where the target brightness value for the blue color channel is between 16 and 48 for a range of possible target brightness values of between 0 and 255.

The target contrast value for the red color channel can be between 112 and 144 for a range of possible target contrast values of between 0 and 255, the target contrast value for the green color channel can be between 112 and 144 for a range of possible target contrast values of between 0 and 255, and the target contrast value for the blue color channel can be between 16 and 48 for a range of possible target contrast values of between 0 and 255.

Embodiments of the systems can also include any of the other features disclosed herein, including features disclosed in connection with different embodiments, in any combination except as expressly stated otherwise.

In a further aspect, the disclosure features methods of generating an output image for choroidal lesion assessment, the methods including: obtaining an input image showing at least a portion of a fundus of an imaging subject, where the input image includes, in each of red, green, and blue color channels, a first set of pixel intensity values; for each one of the color channels, determining a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determining a contrast ratio for the color channel based on a target contrast value for the color channel and the measured contrast value for the color channel, and generating a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generating an output image of the imaging subject based on the second set of pixel intensity values for each of the red, green, and blue color channels, where the target brightness value for the red color channel is between 176 and 208 for a range of possible target brightness values of between 0 and 255, where the target brightness value for the green color channel is between 80 and 112 for a range of possible target brightness values of between 0 and 255, and where the target brightness value for the blue color channel is between 16 and 48 for a range of possible target brightness values of between 0 and 255.

The target contrast value for the red color channel can be between 112 and 144 for a range of possible target contrast values of between 0 and 255, the target contrast value for the green color channel can be between 112 and 144 for a range of possible target contrast values of between 0 and 255, and the target contrast value for the blue color channel can be between 16 and 48 for a range of possible target contrast values of between 0 and 255.

Embodiments of the methods can also include any of the other features disclosed herein, including features disclosed in connection with different embodiments, in any combination except as expressly stated otherwise.

In another aspect, the disclosure features systems for generating an output image for choroidal lesion assessment, the systems including: a detection apparatus configured to obtain an input image showing at least a portion of a fundus of an imaging subject, where the input image includes, in each of red, green, and blue color channels, a first set of pixel intensity values; a display apparatus; and an electronic processor coupled to the detection apparatus and to the display apparatus, and configured to: receive the input image; for each one of the multiple color channels, determine a measured contrast value and a measured brightness value from the first set of pixel intensity values for the color channel, where the measured brightness value corresponds to an arithmetic mean of the first set of pixel intensity values for the color channel, and where the measured contrast value is derived from a distribution of the first set of pixel intensity values for the color channel, determine a contrast ratio for the color channel based on a target contrast value for the color channel and the measured contrast value for the color channel, and generate a second set of pixel intensity values for the color channel, where generating each pixel intensity value in the second set of pixel intensity values includes scaling a corresponding pixel intensity value from the first set of pixel intensity values according to the contrast ratio for the color channel, and adding to the scaled corresponding pixel intensity value a target brightness value for the color channel; and generate an output image of the imaging subject on the display apparatus based on the second set of pixel intensity values for each of the red, green, and blue color channels, where the target brightness value for the red color channel is between 176 and 208 for a range of possible target brightness values of between 0 and 255, wherein the target brightness value for the green color channel is between 80 and 112 for a range of possible target brightness values of between 0 and 255, and where the target brightness value for the blue color channel is between 16 and 48 for a range of possible target brightness values of between 0 and 255.

The target contrast value for the red color channel can be between 112 and 144 for a range of possible target contrast values of between 0 and 255, the target contrast value for the green color channel is between 112 and 144 for a range of possible target contrast values of between 0 and 255, and the target contrast value for the blue color channel can be between 16 and 48 for a range of possible target contrast values of between 0 and 255.

Embodiments of the systems can also include any of the other features disclosed herein, including features disclosed in connection with different embodiments, in any combination except as expressly stated otherwise.

In a further aspect, the disclosure features methods that include obtaining an input image showing at least a portion of a fundus of an imaging subject, where the input image includes, in each of multiple image channels, a first set of pixel intensity values, obtaining target brightness and target contrast values for each of the multiple image channels, where the target brightness and target contrast values are associated with a disease condition of the fundus, for each one of the multiple image channels: determining a measured contrast value and a measured brightness value from the first set of pixel intensity values for the image channel, where the measured brightness value corresponds to an arithmetic mean of the first set of pixel intensity values for the image channel, and where the measured contrast value is derived from a distribution of the first set of pixel intensity values for the image channel; determining a contrast ratio for the image channel based on the target contrast value for the image channel and the measured contrast value for the image channel; and generating a second set of pixel intensity values for the image channel, where generating each pixel intensity value in the second set of pixel intensity values includes scaling a corresponding pixel intensity value from the first set of pixel intensity values according to the contrast ratio for the image channel, and adding to the scaled corresponding pixel intensity value the target brightness value for the image channel, and generating an output image on the display apparatus for use in assessing the fundus of the imaging subject based on the second set of pixel intensity values for each of the multiple image channels.

Embodiments of the methods can also include any of the features disclosed herein, including features disclosed in connection with different embodiments, in any combination except as expressly stated otherwise.

In another aspect, the disclosure features systems that include a detection apparatus configured to obtain an input image showing at least a portion of a fundus of an imaging subject, where the input image includes, in each of multiple image channels, a first set of pixel intensity values, a display apparatus, and an electronic processor coupled to the detection apparatus and to the display apparatus, and configured to: receive the input image from the detection apparatus; obtain target brightness and contrast values for each of the multiple image channels, where the target brightness and contrast values are associated with assessment of the fundus; for each one of the multiple image channels, determine a measured contrast value and a measured brightness value from the first set of pixel intensity values for the image channel, where the measured brightness value corresponds to an arithmetic mean of the first set of pixel intensity values for the image channel, and where the measured contrast value is derived from a distribution of the first set of pixel intensity values for the image channel, determine a contrast ratio for the image channel based on the target contrast value for the image channel and the measured contrast value for the image channel, and generate a second set of pixel intensity values for the image channel, where generating each pixel intensity value in the second set of pixel intensity values includes scaling a corresponding pixel intensity value from the first set of pixel intensity values according to the contrast ratio for the image channel, and adding to the scaled corresponding pixel intensity value the target brightness value for the image channel; and generate an output image on the display apparatus for use in assessing the fundus of the imaging subject based on the second set of pixel intensity values for each of the multiple image channels.

Embodiments of the systems can also include any of the features disclosed herein, including features disclosed in connection with different embodiments, in any combination except as expressly stated otherwise.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and description below. Other features and advantages will be apparent from the description, drawings, and claims.

DESCRIPTION OF DRAWINGS

Like reference symbols in the various drawings indicate like elements.

DETAILED DESCRIPTION

I. General Introduction

Figure 1:
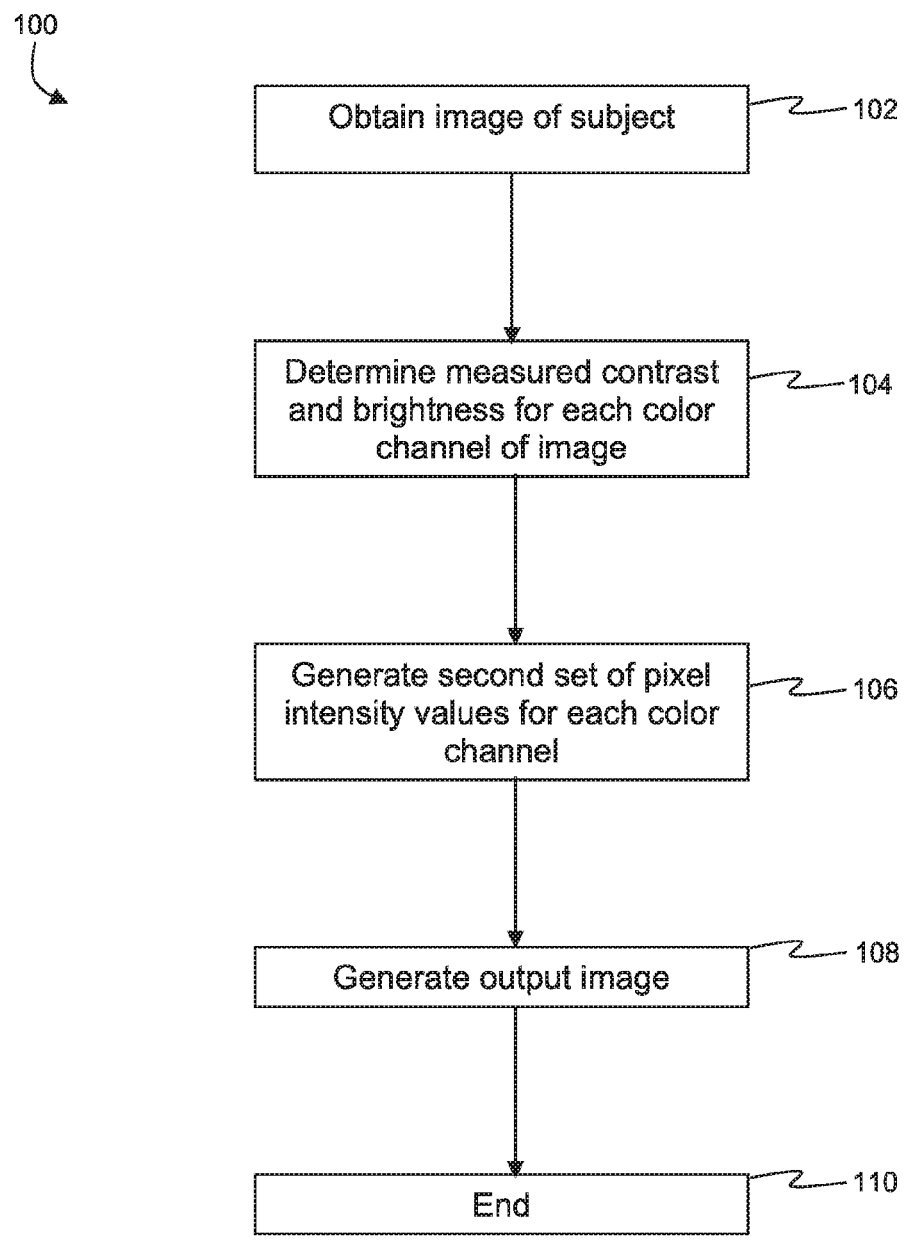
FIG. 1 is a schematic diagram showing a series of example steps for image adjustment and standardization.

Digital images can be used for a variety of applications depending upon the subject matter of the images. For example, images can be used to construct libraries of information and/or for general archiving purposes. In manufacturing environments, images can be used for product quality control and/or to monitor fabrication processes. Digital images are also widely used for medical diagnostic purposes, both manual and automated. A wide variety of different diseases and conditions can be identified by obtaining and assessing suitable image information from patients.

For many applications, images obtained using different imaging systems are used for assessments. Such images can include artifacts arising from the particular configurations of the different imaging systems and/or the conditions under which the images were obtained (e.g., conditions under which illumination of the subject occurs, integration times and other imaging parameters used for image capture). These disparate conditions and imaging hardware can lead to images in which a certain amount of variability exists; this variability can, in some cases, obscure important diagnostic and/or archival information.

As one example, fundus images are often used for evaluating the condition of the retina in multicenter clinical trials, telemedicine programs, and even routine clinical care. Despite the development of newer imaging modalities such as spectral domain and swept source optical coherence tomography (OCT) and OCT angiography, fundus imaging remains a critical part of modern ophthalmic practice and, in some cases, is still considered the gold standard. Through fundus imaging, telemedicine is transforming disease screening by extending the reach of ophthalmologists into underserved communities. Retinal imaging has become increasingly important for the screening and timely management of retinopathy of prematurity (ROP) because the supply of pediatric ophthalmologists may not match the demand of premature babies requiring ROP screening. In addition, fundus images can be used to diagnose and monitor other ocular conditions, including diabetic retinopathy, age-related macular degeneration (AMD), and glaucoma. Fundus images can also be used to evaluate systemic conditions such as hypertension and malaria.

When used for such applications, however, unstandardized images—that is, images that have not been corrected by adjusting brightness and/or contrast in different color channels—can be difficult to assess. Moreover, the absence of standardized images complicates the use of images obtained at different physical locations and/or using different imaging systems. Poor quality, unstandardized images can affect accurate diagnosis as well as disease staging.

Variability in image quality, including imprecise reproduction of the ophthalmologist's view of the fundus and/or lack of color consistency (which can arise when images are obtained under different conditions and with different detection systems) can significantly reduce the usefulness of digital images such as fundus images. Manual processing of such images, including adjustment of properties such as brightness and contrast, can reduce some variability. However, the manual processing of such images is also subject to variability due to the intercession of a human operator, and is a time-consuming task. Thus, for examination of a large volume of images for diagnostic or screening purposes, manual adjustment may be inadequate.

In contrast, automated processing of digital images can be performed at higher speed according to a defined set of criteria, eliminating the human operator as a source of variability among processed images. Such methods can be used to generate high quality standardized digital images for routine clinical care, for telemedicine programs, and for reading centers conducting multicenter clinical trials.

II. Image Processing

FIG. 1 shows a flow chart 100 that includes a series of example steps for processing and standardizing digital images. In the first step 102, an input image of a subject is obtained using, e.g., a detection apparatus. Typically, the image includes multiple color channels. For example, in some embodiments, the input image is a red-green-blue image that includes red (R), green (G), and blue (B) color channels. In certain embodiments, the input image is a cyan-magenta-yellow-black image that includes cyan (C), magenta (M), yellow (Y), and black (B) color channels.

More generally, the input image can include 2 or more color channels (e.g., 3 or more color channels, 4 or more color channels, 5 or more color channels, 6 or more color channels, or even more color channels). Each of the color channels can correspond to a band of wavelengths of image light, with an associated central wavelength. Typically, for example, one or more of the wavelength bands associated with the color channels has a full width at half maximum width of 3 nm or more (e.g., 5 nm or more, 10 nm or more, 20 nm or more, 30 nm or more, 50 nm or more, 75 nm or more, 100 nm or more).

In some embodiments, one of the color channels corresponds to a band of wavelengths for which a central wavelength is between 600 nm and 740 nm (e.g., between 620 nm and 720 nm, between 640 nm and 700 nm, between 640 nm and 680 nm). In certain embodiments, one of the color channels corresponds to a band of wavelengths for which a central wavelength is between 500 nm and 530 nm (e.g., between 500 nm and 520 nm, between 510 nm and 520 nm). In some embodiments, one of the color channels corresponds to a band of wavelengths for which a central wavelength is between 455 nm and 485 nm (e.g., between 460 nm and 480 nm, between 465 nm and 480 nm, between 470 nm and 480 nm).

In certain embodiments, one or more of the color channels corresponds to a band of wavelengths for which a central wavelength is in the infrared region of the spectrum, between 850 nm and 2.5 microns (e.g., between 900 nm and 1.5 microns). In some embodiments, the central wavelength can be between 2.5 microns and 10 microns (e.g., between 3 microns and 9 microns, between 4 microns and 8 microns).

In certain embodiments, one or more of the color channels corresponds to a band of wavelengths for which a central wavelength is in the ultraviolet region of the spectrum, between 170 nm and 400 nm (e.g., between 190 nm and 380 nm, between 220 nm and 360 nm, between 250 nm and 350 nm, between 275 nm and 350 nm).

More generally, the input image can be represented by multiple image channels, and the image channels can correspond to specific colors (e.g., red, green, blue), or the image channels (which are still referred to as "color" channels herein for simplicity) can correspond to specific color components in a colorspace system. The colorspace systems that can be represented by the image channels include additive, subtractive, and other colorspace systems.

For example, in some embodiments, the image channels can correspond to the cyan (C), magenta (M), yellow (Y), and black (B) channels of the CMYK colorspace system, as discussed above. In certain embodiments, the image channels can correspond to intensity (Y), blue chrominance (Cb), and red chrominance (Cr) channels of the Y:Cb:Cr colorspace system. In some embodiments, the image channels can correspond to intensity (Y) and two color chrominance channels (U and V) of a general Y:U:V colorspace system. In certain embodiments, the image channels can correspond to hue (H), luminance (L), and saturation (S) or brightness (B) channels of a HSL or HSB colorspace system. In some embodiments, the image channels can correspond to lightness (L) and two color opponent dimension channels (a) and (b) of a CIE L*a*b colorspace system.

The input image consists of a plurality of pixels, each of which features associated pixel intensity values in each of the input image's color channels. Accordingly, the input image includes sets of pixel intensity values corresponding to each of the color channels. For example, a RGB input image includes three sets of pixel intensity values corresponding to the R, G, and B color channels, respectively.

Pixel intensity values can generally be represented in binary form at any desired bit depth. In some embodiments, for example, pixel intensity values in some or all of the color channels of the input image are represented as 8-bit integers, with values from 0 to 255. For an input image with three color channels (e.g., R, G, B), a single 24-bit integer can be used to represent pixel intensity values in each of the three color channels for a given pixel. More generally, pixel intensity values in each of the input image's color channels can be represented as integers of any bit depth (e.g., 8-bit, 10-bit, 12-bit, 16-bit, 24-bit, 32-bit, 64-bit, or even greater bit depth), as desired.

In some embodiments, all of the pixels in the input image contribute to the sets of pixel intensity values for purposes of determining measured contrast and brightness values, as discussed below in more detail. However, in certain embodiments, only a subset of the pixels in the input image are selected for analysis to determine the measured contrast and brightness values of the input image. A variety of different criteria can be used to exclude or include individual pixels within the selected group. For example, pixels which are poorly imaged or correspond to imaging aberrations or defects can be excluded from the determination of measured and contrast values, to avoid improperly biasing the values of these parameters.

Returning to FIG. 1, in the next step 104, contrast and brightness values are measured for each of the color channels in the input image. A brightness value for each color channel can be determined in a variety of ways. For example, in some embodiments, the measured brightness value for each color channel is determined as the arithmetic mean pixel intensity among the set of pixel intensity values of the input image associated with the color channel. Using the index i to represent the color channel number and $\{P_{i,j}\}$ as the set of pixel intensity values for color channel i, indexed by j, the measured brightness value for color channel i of the input image, $BT_i$, can be expressed as:

$$BT_i = \frac{\sum_{j=1}^{ni} P_{i,j}}{ni} \quad [1]$$

where ni is the total number of pixel intensity values (i.e., j=1 . . . ni) in color channel i.

As an example, where the input image includes three color channels, i=R, G, B, the three measured brightness values for the color channels can be calculated as the three arithmetic means of the pixel intensity values in each of the respective color channels, as:

$$BT_R = \frac{\sum_{j=1}^{nR} P_{R,j}}{nR} \quad [2]$$

$$BT_G = \frac{\sum_{j=1}^{nG} P_{G,j}}{nG}$$

$$BT_B = \frac{\sum_{j=1}^{nB} P_{B,j}}{nB}$$

By determining the measured brightness of each color channel in the input image as the arithmetic mean of the set of pixel intensity values associated with the color channel, an improved representation of the brightness of each color channel can be achieved, particularly where the pixel intensities within each color channel include multiple local maximum values. Certain alternative brightness measures, such as determining the brightness as the mode of the distribution of the set of pixel intensity values, may not adequately represent the brightness of the color channel in strongly asymmetric and/or non-Gaussian distributions of pixel intensity values.

In contrast, even when a distribution of pixel intensity values for a given color channel includes multiple local maximum values, the arithmetic mean pixel intensity value is always single-valued and well defined. Moreover, the arithmetic mean pixel intensity value can be calculated rapidly from the set of pixel intensity values, with no searching through the set of pixel intensity values to locate maximum values required.

In some embodiments, other methods can also be used for determining the measured brightness of each color channel. For example, a weighted average can be used in Equation (2), in which pixel intensity values that are further away from the center of the pixel intensity distribution in each channel are accorded decreasing weights based on their distance from the center of the distribution. This can be implemented in Equation (1) by introducing weighting factors $\omega_j$ multiplying each of the pixel intensity values $P_{i,j}$, where the sum of the weighting factors is normalized, as follows:

$$BT_i = \frac{\sum_{j=1}^{ni} \omega_j P_{i,j}}{ni}, \quad \sum_j \omega_j = 1 \qquad [3]$$

Returning to step 104, measured contrast values are also determined for each of the input image's color channels. In general, the measured contrast value for each channel represents the width of the distribution of pixel intensity values for each channel, and is related to the span or width of the color curve for each channel.

A variety of different methods can be used to determine the measured contrast value for each color channel. In some embodiments, the measured contrast value is determined from a statistical measurement associated with the distribution of pixel intensity values in each of the color channels. For example, the measured contrast values can be determined from the standard deviations of the distributions of pixel intensity values in each respective color channel, e.g., as a multiple of each respective standard deviation.

As one example, in certain embodiments, if $\sigma_i$ represents the standard deviation of the distribution of pixel intensity values in color channel i of the input image, then the measured contrast value for color channel i can be calculated as $k\sigma_i$. The multiplication factor k can be chosen based on a desired amount by which the contrast value spans the distribution of pixel intensity values. For example, k can be 4 so that the contrast value for channel i is $4\sigma_i$. For k=4, the contrast value spans more than 95% of the color curve associated with channel i.

More generally, in some embodiments, k can take a variety of values. For example, k can be 1.5 or more (e.g., 2.0 or more, 2.5 or more, 3.0 or more, 4.0 or more, 5.0 or more, or even more).

Typically, determining the measured contrast value based on the standard deviation of the distribution of pixel intensity values provides an improved measure of contrast relative to other quantities such as the span (i.e., the total width) of the distribution. It can be difficult to determine exactly where the distribution begins and ends, and intensity distributions with long, sparsely populated tails may lead to a determination of contrast that is improperly large. Using a statistical quantity such as the standard deviation of the pixel intensity distribution as the basis for determining the contrast value ensures that the contrast value can be calculated rapidly and determinatively, thereby providing a metric that more accurately reflects the image contrast.

In some embodiments, other methods can be used to determine the measured contrast values for each color channel. For example, the variance (or a multiple of the variance) of the distribution of pixel intensities in each color channel can be used to determine the contrast value for each channel. As another example, the median absolute deviation for the distribution of pixel intensities in each color channel can be used to determine the contrast value for each channel.

Returning to step 104, after the measured contrast and brightness values have been determined for each of the color channels in the input image, in step 106, a second set of pixel intensity values for each of the color channels in the input image is generated. Generation of the second set of pixel intensity values can be regarded as "standardizing" the input image against objective numerical targets or criteria that represent useful diagnostic outcomes.

In step 106, standardization is performed relative to target brightness and contrast values for each of the color channels in the input image. The target brightness and contrast values for a color channel i can be represented by $T_{BT,i}$ and $T_{C,i}$, respectively.

As an optional procedure within step 106, a contrast ratio $\alpha_i$ can be calculated for some or all of the channels as a ratio of the target contrast, $T_{C,i}$, to the measured contrast value of the respective channel. For example, when the measured contrast value for channel i is $4\sigma_i$, then $\alpha_i = T_{C,i}/4\sigma_i$.

To generate the second set of pixel intensity values for each color channel i, a pixel-by-pixel transformation is applied to each set of pixel intensity values (e.g., for a single color channel). In some embodiments, the transformation for each pixel can include scaling the previous pixel intensity value in the color channel. Scaling can be performed by multiplying the previous pixel intensity value by a constant or variable quantity, such as the contrast ratio $\alpha_i$.

The transformation for each pixel can also include, in certain embodiments, adding the target brightness value $T_{BT,i}$ to the scaled previous pixel intensity value for each color channel. In this respect, the target brightness value $T_{BT,i}$ represents an offset that shifts the pixel intensity toward the target brightness for the output image.

In certain embodiments, the transformation for each pixel can also include subtracting from the scaled previous pixel intensity value for each color channel a scaled measured brightness value for the color channel in the input image. The measured brightness value for the color channel in the input image can generally be scaled according to any constant or variable scaling factor. For example, in some embodiments, the measured brightness value for the color channel in the input image can be scaled according to the contrast ratio before being subtracted from the scaled measured brightness value for the color channel.

Based on the foregoing steps, second sets of pixel intensity values for each of the color channels in an output image can be calculated pixel-by-pixel from the measured and target brightness and contrast values for each of the input image's color channels. As an example, the intensity of a pixel j in the second set of pixel intensity values for color channel i, $X_{j,i}$, can be calculated from the intensity of pixel j in the first set of pixel intensity values for color channel i, $U_{j,i}$, as:

$$X_{j,i} = \alpha_i \cdot U_{j,i} + T_{BT,i} - \alpha_i \cdot BT_i \quad [4]$$

Using Equation (4), second sets of pixel intensity values $\{X_{j,i}\}$ can be calculated for all j pixels in each of the i color channels.

In Equation (4), a set of i target contrast values, $T_{C,i}$ and a set of i target brightness values, $T_{BT,i}$ are used to calculate the second sets of pixel intensity values. Target contrast values in the second sets of pixel intensity values are approximated by scaling the initial pixel intensity values from the input image by the ratio of the target contrast values to the measured contrast values. Target brightness values in the second sets of pixel intensity values are approximated by adding constant terms to the scaled initial pixel intensity values.

In some embodiments, the second sets of pixel intensity values calculated using Equation (3) can be corrected to ensure they fall within a defined range of "acceptable" values. For example, pixel intensity values that are calculated to be less than zero can be set to zero. Further, pixel intensity values that are calculated to be larger than the upper limit for the intensity values can be set to the upper limit value. As an example, for an input image with 8-bit intensity values in each color channel, each of the calculated pixel intensity values in the second set should be between 0 and 255 in each color channel. Values that are calculated to be less than zero are set to 0, and values that exceed 255 are set to 255. More generally, for pixel intensity values in a color channel at a bit depth of n, calculated pixel intensity values in the second set can be adjusted to ensure that they are no smaller than 0, and no larger than $2^n - 1$.

Returning to FIG. 1, after the second set of pixel intensity values has been generated in step 106, an output image can optionally be generated and displayed in step 108 from the second set of pixel intensity values. In general, the output image features the same number of color channels as the input image, with the second sets of pixel intensity values forming the pixel intensities in the channels of the output image.

Typically, by performing the pixel-based transformations disclosed herein, the output image is better suited for a variety of applications than the input image. In certain embodiments, the improved suitability of the output image is related to its transformation based on the target contrast and brightness values. That is, the target contrast and brightness values are generally chosen specifically to effect a transformation of the input image for a particular application. Because the measured brightness and contrast values for the output image correspond more closely to the target contrast and brightness values than the measured brightness and contrast values for the input image, output images generated as disclosed herein are better suited for specific diagnostic and other applications. Following step 108, the procedure in FIG. 1 ends at step 110.

The methods disclosed herein permit the generation of output images with "standardized" or "targeted" brightness and contrast values. In certain embodiments, the differences between the measured brightness values for each of the color channels in the output image (i.e., measured in the same manner as for the input image) and the corresponding target brightness values for each of the color channels are smaller in magnitude than the differences between the measured brightness values for each of the color channels from the first set of pixel intensity values and the corresponding target brightness values. For example, the magnitudes of the differences between the measured brightness values for each of the color channels and the corresponding target brightness values for each of the color channels can be less than 10% of the target brightness values (e.g., less than 5% of the target brightness values, less than 3% of the target brightness values, less than 1% of the target brightness values).

In some embodiments, differences between the measured contrast values for each of the color channels in the output image (i.e., measured in the same manner as for the input image) and the corresponding target contrast values for each of the color channels are smaller in magnitude than differences between the measured contrast values for each of the color channels from the first set of pixel intensity values and the corresponding target contrast values. For example, in the output image, the magnitudes of the differences between the measured contrast values for each of the color channels and the corresponding target contrast values for each of the color channels are less than 25% of the target contrast values (e.g., less than 15% of the target contrast values, less than 10% of the target contrast values, less than 5% of the target contrast values).

The steps of the methods disclosed herein involve linear computations which are straightforward to implement, and execute rapidly. As a result, output images can typically be generated from input images in a few seconds per image.

Measured brightness values of the output images are typically very close to the target brightness values, while measured contrast values of the output images generally differ by a slightly larger amount from the target contrast values. Without wishing to be bound by theory, it is believed that this is due to the discrete, integer nature of the pixel intensity values. When the initial pixel intensity values are transformed, e.g., using Equation (3), individual pixel intensity values can saturate, so that for certain input images, the target brightness and contrast values are not obtained. In general, it was observed that brightness adjustment in the output image had a larger overall effect on the appearance of the image than contrast adjustment.

III. Examples

Figure 2A:
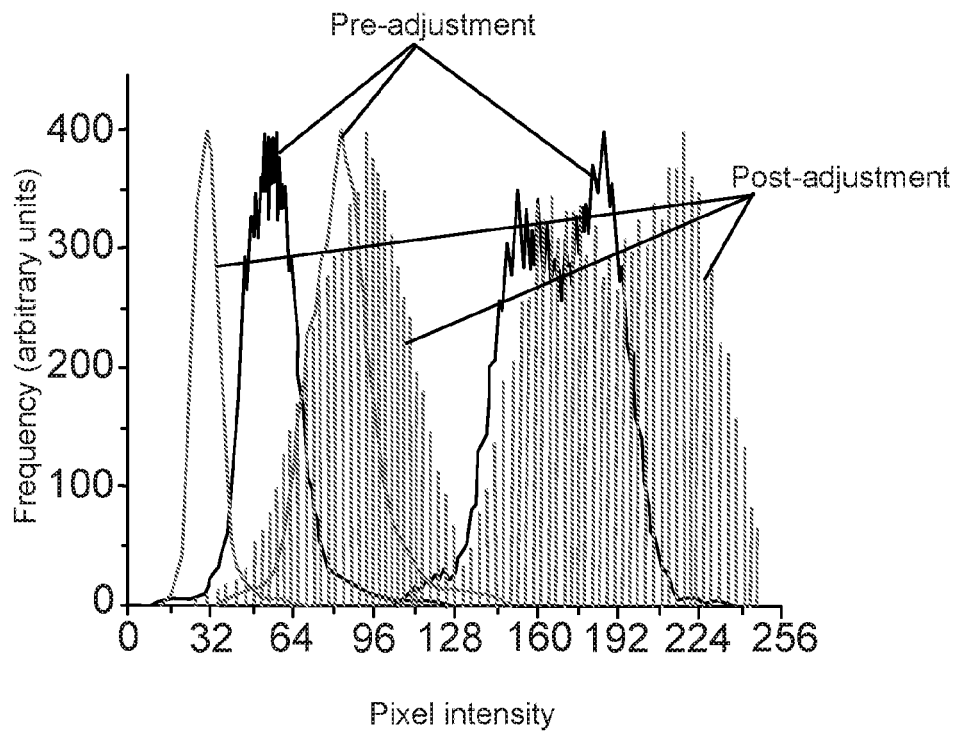
FIG. 2A is a graph showing pixel intensity distributions in multiple color channels of an image before and after adjustment.

FIG. 2A is a plot showing sets of R, G, and B pixel intensity values from an input image, and sets of "standardized" R, G, and B pixel intensity values following transformation based on target brightness and contrast values as discussed herein. For both the red and green color channels, the measured contrast in the standardized sets of pixel intensity values is larger than the measured contrast in the sets of pixel intensity values from the input image. Contrast adjustment in these color channels creates vertical jumps in the pixel intensity distributions.

For the blue channel, the measured contrast in the standardized set of pixel intensity values is smaller than the measured contrast in the set of pixel intensity values from the input image. Contrast adjustment in this channel effectively smooths the distribution of the output set of pixel intensity values, relative to the set of values from the input image.

Figure 2B:
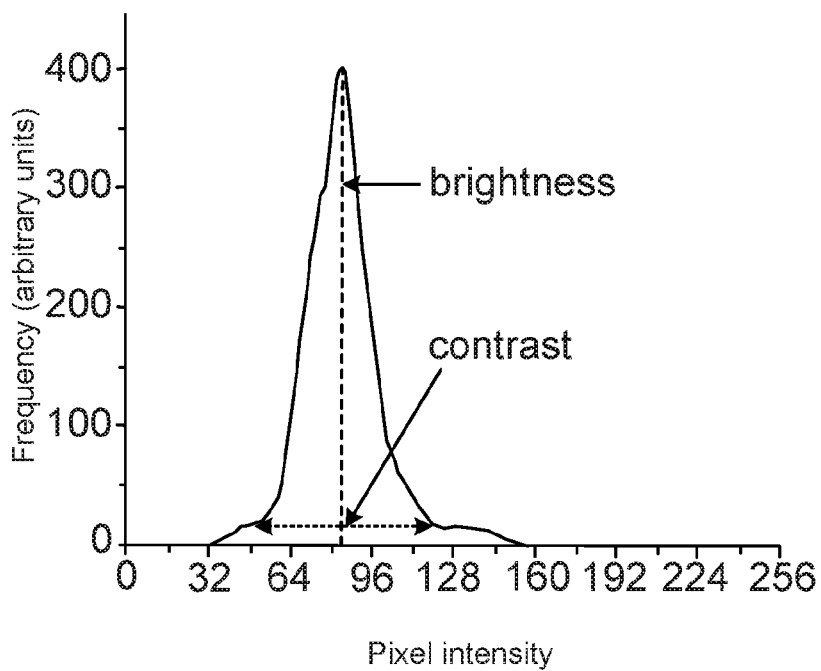
FIG. 2B is a graph showing a pixel intensity distribution in a color channel of an image, and measurements of brightness and contrast for the color channel.

FIG. 2B is a plot showing a set of pixel intensity values for a color channel of an input image. As shown in the plot, the measured brightness value for the color channel can, in some embodiments, be calculated as the arithmetic mean of the pixel intensity values. The measured contrast value in certain embodiments can be calculated as a multiple (e.g., 4×) of the standard deviation of the distribution of pixel intensity values.

Figure 3B:
FIG. 3B is an output image corresponding to the input image of FIG. 3A following adjustment.
Figure 3A:
FIG. 3A is an input image showing ocular tissue prior to adjustment.

FIG. 3A is an example of an input image of ocular tissue that can be adjusted or standardized according to the methods disclosed herein. Measured brightness values in the R, G, and B color channels for the image in FIG. 3A were 105.8, 37.6, and 15.3, respectively. Measured contrast values for the color channels were 93.1, 45.3, and 25.3, respectively.

To enhance the diagnostic information provided through visual inspection of FIG. 3A, the input image was adjusted using the methods disclosed herein, and based on target brightness values (R, G, B) of 192, 96, and 32, and target contrast values (R, G, B) of 128, 128, and 32. The target brightness and contrast values were selected based on published sources.

FIG. 3B shows the transformed output image. In the output image, the measured brightness values were 192.0, 96.0, and 32.0, matching the target brightness values precisely. The measured contrast values were 127.6, 128.0, and 32.0, which also closely match the target contrast values.

Figure 4A:
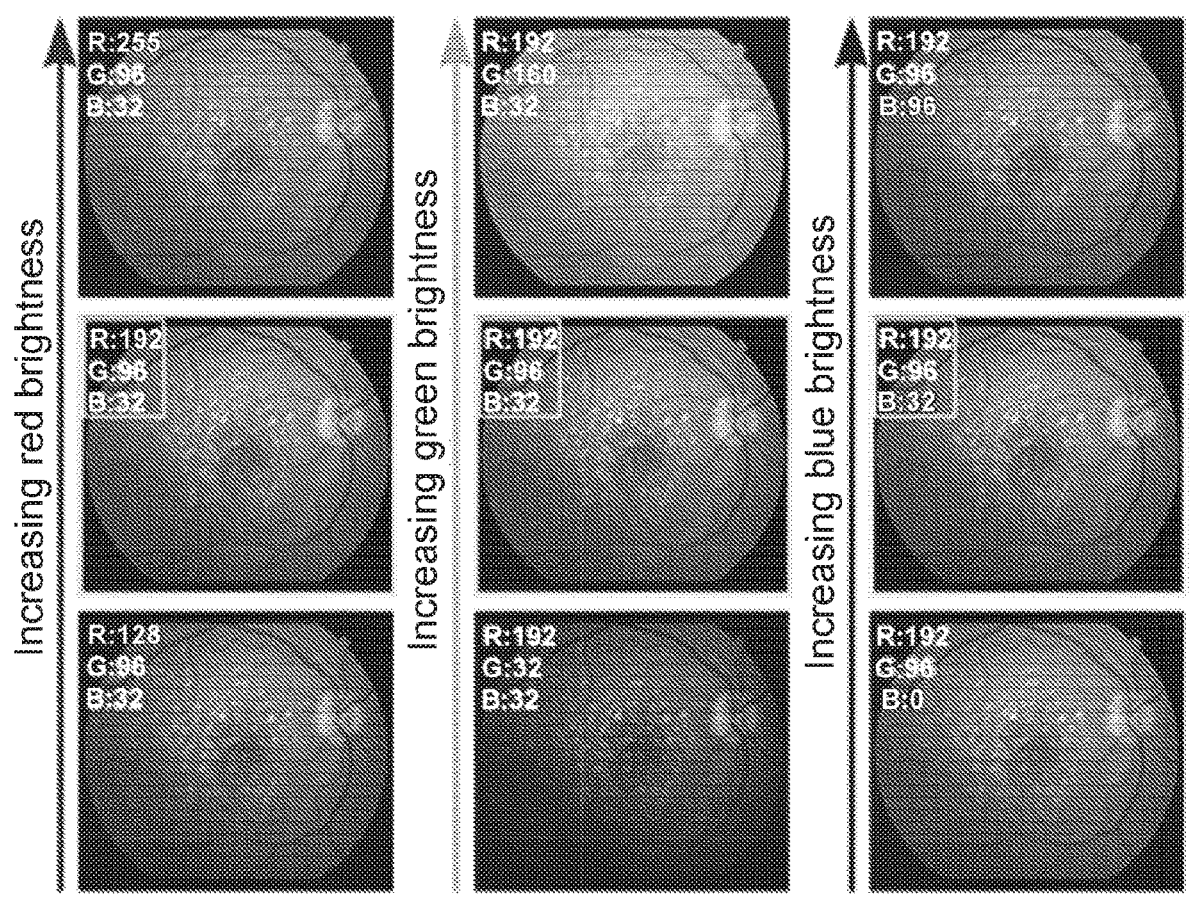
FIG. 4A shows a series of output images generated from a common input image and corresponding to different target brightness values in different color channels.
Figure 4B:
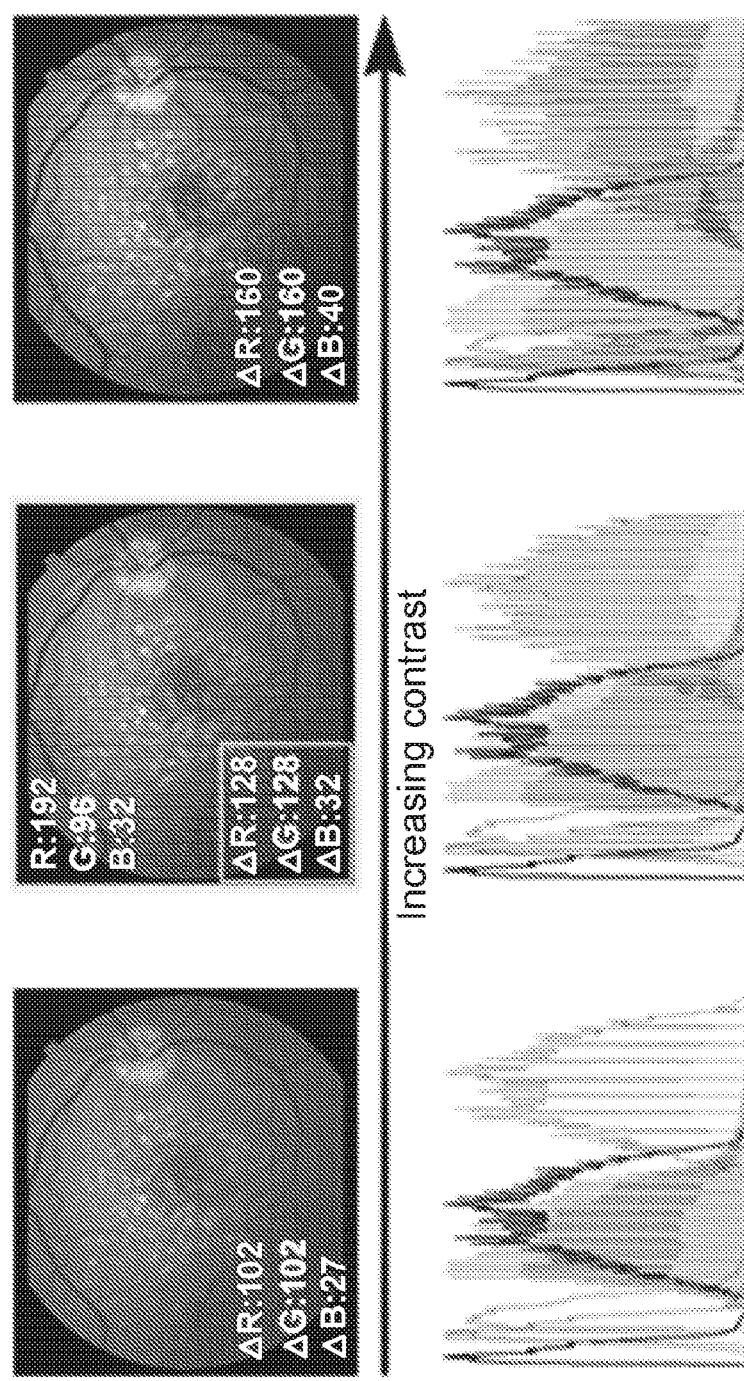
FIG. 4B shows a set of output images generated from a common input image and corresponding to different target contrast values in different color channels, and a set of corresponding graphs showing pixel intensity distributions in each of the color channels of the images.

FIG. 4A shows a set of output images generated from a common input image, where brightness in each of the three color channels is independently varied along each column of images. In each column of images, the "standardized" output image is shown in the middle. FIG. 4B shows a set of output images generated from a common input image, where contrast in each of the three color channels increases among the images. The distributions of pixel intensity values corresponding to the color channels before and after transformation are also shown in FIG. 4B.

In general, adjusting the brightness of the color channels produces a more marked effect in the output images than does adjusting the contrast. Changes to the red and green channels were complementary, so that decreasing the brightness of the red channel produced an effect similar to increasing the brightness of the green channel. Increasing the proportion of blue appeared to reduce image contrast. The effect of varying image contrast was more difficult to discern than brightness changes, but greater contrast can generally increase the visibility of pathological signatures like drusen. The distributions of pixel intensity values became spikier as the contrast was increased.

Figure 5:
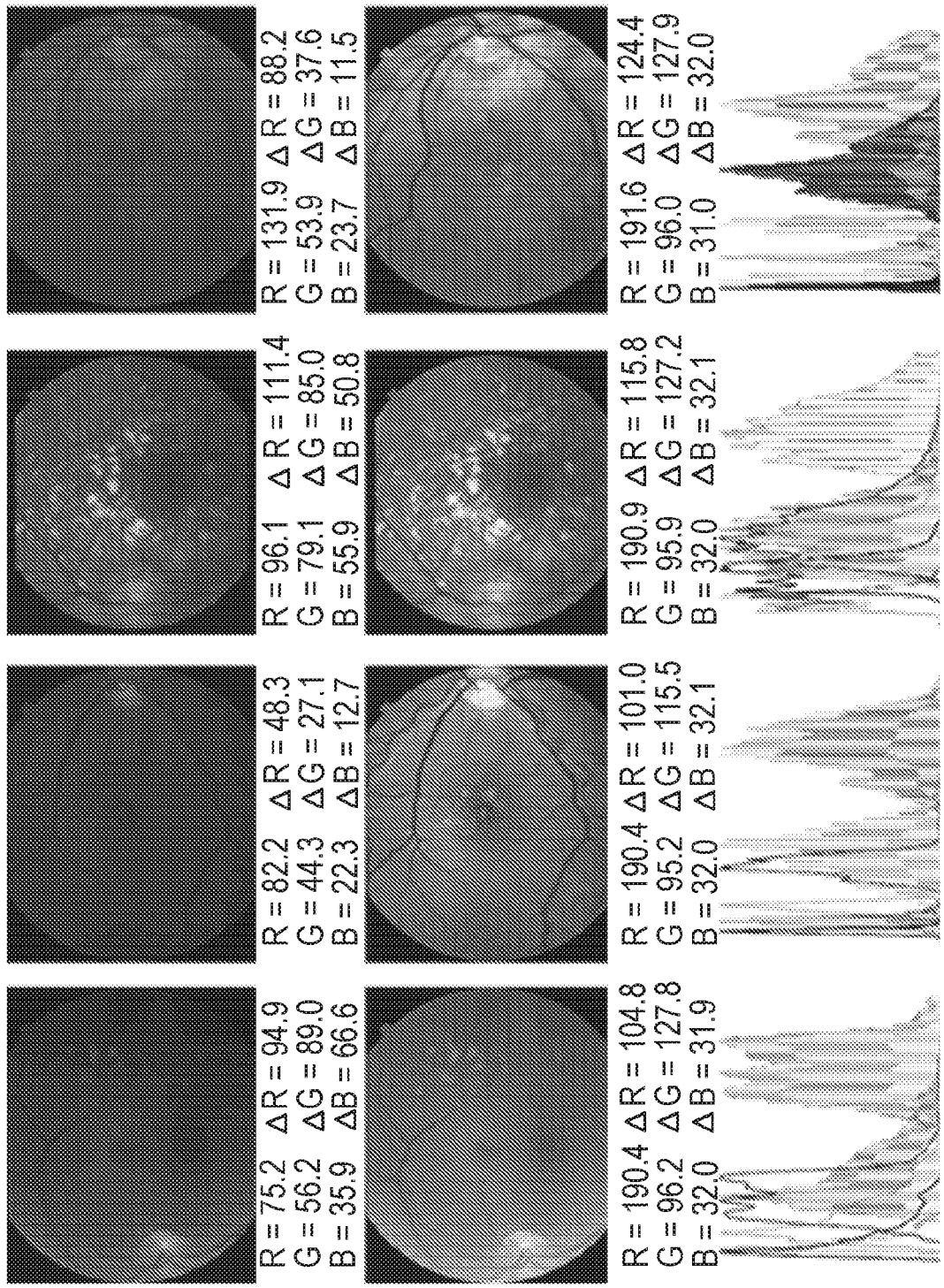
FIG. 5 shows a series of four input images of ocular tissue from patients with age-related macular generation (top row), a series of four output images generated from the input images following adjustment (middle row), and a series of four graphs showing pixel intensity distributions in the color channels of each of the corresponding input and output images.

FIG. 5 shows a series of images of ocular tissue from patients with age-related macular degeneration. Four non-standardized input images are shown in the top row of FIG. 5. These images were significantly underexposed. However, following standardization using target brightness and contrast values from published sources, the visibility of the drusen in the output images was improved (images in the middle row of FIG. 5), and the output images were corrected for initial exposure differences. The histograms in the third row of FIG. 5 show the pixel intensity values in the color channels of the images before and after transformation. Brightness values are represented by R, G, and B, while contrast values are represented by $\Delta R$, $\Delta G$, and $\Delta B$, respectively.

Figure 6A:
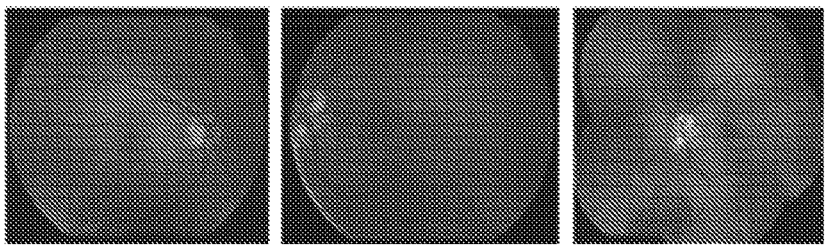
FIG. 6A shows a series of three input images of ocular tissue from patients with diabetic retinopathy.
Figure 6B:
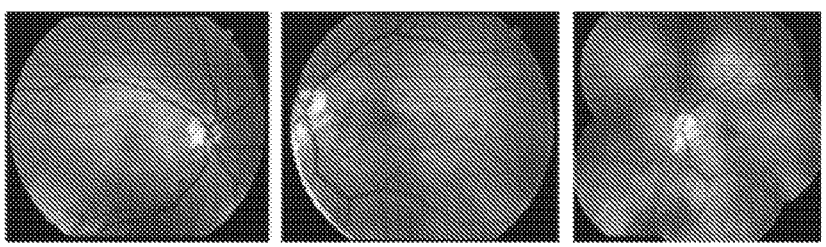
FIG. 6B shows a series of three output images generated from the corresponding input images of FIG. 6A by performing image adjustment based on target brightness and contrast values for the color channels of the images.

FIGS. 6A-6F show images of ocular tissue from patients with a variety of disease conditions. In FIG. 6A, input images from patients with diabetic retinopathy are shown. For four eyes of four subjects, initial mean brightness values (red, green, blue) were 121.1±7.2, 64.8±6.5, and 45.4±12.2, and initial mean contrast values (red, green, blue) were 100.7±9.3, 54.6±5.3, and 41.0±9.3. The input images from FIG. 6A were standardized using the methods disclosed herein, according to brightness values R=192, G=96, and B=32, and contrast values $\Delta R$=128, $\Delta G$=128, and $\Delta B$=32 (on an 8-bit intensity scale from 0 to 255). The corresponding output images following standardization are shown in FIG. 6B. After standardization, mean brightness values (red, green, blue) were 191.2±0.4, 95.8±0.2, and 32.0±0.0, and mean contrast values (red, green, blue) were 117.4±6.6, 123.1±3.9, and 31.9±0.1. Standardization for this set of images helped to highlight dot blot hemorrhages in the retina.

Figure 6C:
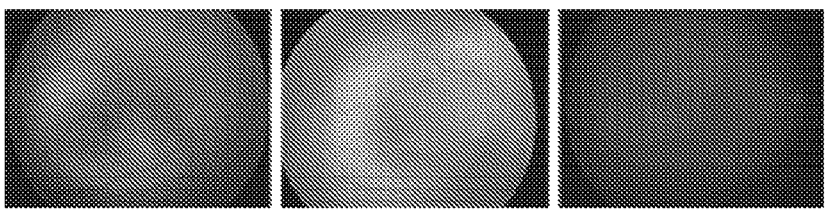
FIG. 6C shows a series of three input images of ocular tissue from patients with retinopathy of prematurity.
Figure 6D:
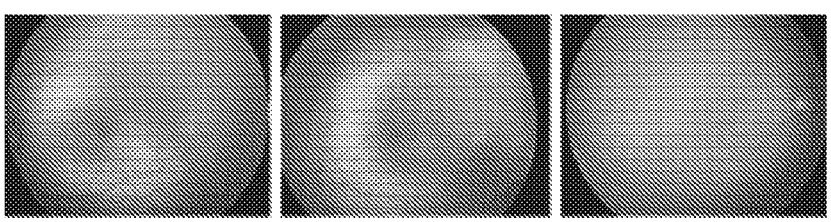
FIG. 6D shows a series of three output images generated from the corresponding input images of FIG. 6C by performing image adjustment based on target brightness and contrast values for the color channels of the images.

In FIG. 6C, input images from patients with retinopathy of prematurity are shown. The mean initial brightness values (red, green, blue) for the images were 123.4±40.7, 94.5±31.6, and 65.0±33.8, and the mean initial contrast values (red, green, blue) were 125.2±27.5, 83.9±3.3, and 70.5±21.0. The images from FIG. 6C were standardized according to brightness values R=170, G=134, and B=109, and contrast values $\Delta R$=204, $\Delta G$=128, and $\Delta B$=56 (on an 8-bit intensity scale from 0 to 255). Corresponding output images are shown in FIG. 6D. After standardization, mean brightness values (red, green, blue) were 170.1±0.2, 135.1±0.2, and 110.0±0.0, and mean contrast values (red, green, blue) were 202.1±2.4, 125.7±3.2, and 56.0±0.0. The output images show an enhancement of the avascular zone.

Figure 6E:
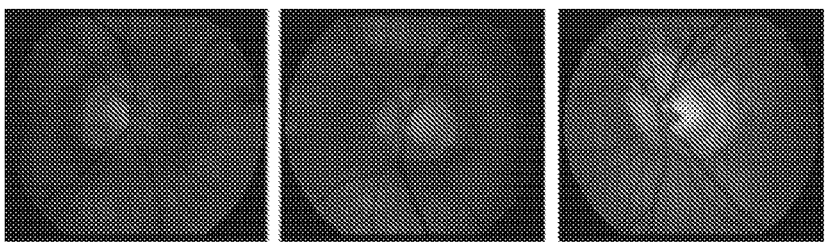
FIG. 6E shows a series of three input images of ocular tissue from patients with glaucoma.
Figure 6F:
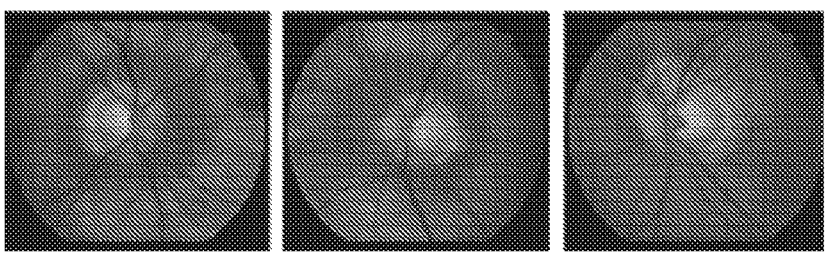
FIG. 6F shows a series of three output images generated from the corresponding input images of FIG. 6E by performing image adjustment based on target brightness and contrast values for the color channels of the images.

In FIG. 6E, input images from patients with glaucoma are shown. The mean initial brightness values (red, green, blue) for the images were 117±15.6, 55.2±11.7, and 29.0±4.2, and the mean initial contrast values (red, green, blue) were 72.2±9.7, 72.5±18.4, and 64.1±15.7. The input images were standardized according to brightness values R=150, G=75, and B=37, and contrast values $\Delta R$=80, $\Delta G$=80, and $\Delta B$=80 (on an 8-bit intensity scale from 0 to 255). Corresponding output images are shown in FIG. 6F. After standardization, mean brightness values (red, green, blue) were 150±0.0, 75.0±0.0, and 37.0±0.0, and mean contrast values (red, green, blue) were 80.1±0.0, 80.0±0.1, and 80.0±0.2. The output images show an enhancement of the cup borders.

IV. Calibration

As discussed above, in some embodiments, input images can be standardized according to brightness and contrast parameters derived from literature sources. Where sources for these parameters are not available, or where it is desirable to independently obtain these parameter values instead, suitable values of brightness and/or contrast parameters for standardization of images can be obtained through independent calibration.

For example, certain diseases such as diabetic retinopathy, glaucoma, and retinopathy of prematurity have not established "optimal" brightness and contrast parameters for diagnostic standardization. To obtain calibration information corresponding to these diseases (i.e., brightness and contrast values to standardize images for use in diagnosing these conditions), one or more example image(s) was/were analyzed to determine baseline brightness and contrast values in each of the color channels, as discussed above.

Then, the brightness and contrast target values in each of the color channels were iteratively adjusted, and the example images were standardized against each new set of adjusted target values. For glaucoma diagnosis, brightness and contrast target values were selected to enhance detail of the disc while maintaining color of the neuroretinal rim. For retinopathy of prematurity, brightness and contrast target values were adjusted to improve the visibility of the avascular boundary. For diabetic retinopathy, brightness and contrast target values were selected to enhance the visibility of retinal hemorrhages and hard exudates.

Consistent with the previous discussion, the example image(s) yield a first set of pixel intensity values, and standardization against the adjusted brightness and contrast target values yields a second set of pixel intensity values generated from the first set. The second set of pixel intensity values can be used to generate one or more calibration output images, which are then examined to determine whether standardization against the target brightness and contrast values yields diagnostic images that are sufficiently useful for particular disease conditions. If so, the target brightness and contrast values can be stored as calibration information to be used for subsequent image standardization operations.

V. Applications

The methods disclosed herein can be used to standardize images obtained using a wide variety of detectors. Moreover, the methods can be used to standardize images that are used in a variety of medical and non-medical applications. One such application is in diagnosis of various diseases of the eye.

(i) Retinopathy of Prematurity

In some embodiments, for example, the methods disclosed herein can be used to standardize fundus images for diagnosis of retinopathy of prematurity. In general, assessment of retinopathy of prematurity involves evaluation of the avascular zone boundary of the fundus. For such assessments, target brightness values of between 154 and 186 in a red color channel (e.g., between 162 and 178, between 165 and 175), between 118 and 150 in a green color channel (e.g., between 126 and 142, between 129 and 139), and between 93 and 125 in a blue color channel (e.g., between 101 and 117, between 104 and 114) can be used for standardization (e.g., as part of the calibration information). Target contrast values of between 188 and 220 (e.g., between 196 and 212, between 199 and 209) in the red color channel, between 112 and 144 (e.g., between 120 and 136, between 123 and 133) in the green color channel, and between 40 and 72 (e.g., between 48 and 64, between 51 and 61) in the blue color channel can be used.

(ii) Glaucoma

In certain embodiments, the methods disclosed herein can be used to standardize fundus images for diagnosis of glaucoma. Glaucoma assessment generally involves evaluation of the optic disc. For such assessments, target brightness values of between 134 and 166 (e.g., between 142 and 158, between 145 and 155) in a red color channel, between 59 and 91 (e.g., between 67 and 83, between 70 and 80) in a green color channel, and between 21 and 53 (e.g., between 29 and 45, between 32 and 42) in a blue color channel can be used for standardization (e.g., as part of the calibration information). Target contrast values of between 64 and 96 (e.g., between 72 and 88, between 75 and 85) in the red color channel, between 64 and 96 (e.g., between 72 and 88, between 75 and 85) in the green color channel, and between 64 and 96 (e.g., between 72 and 88, between 75 and 85) in the blue color channel can be used.

(iii) Diabetic Retinopathy, Age-Related Macular Degeneration, Drusen, and Choroidal Lesions In some embodiments, the methods disclosed herein can be used to standardize fundus images for diagnosis of diabetic retinopathy, age-related macular degeneration, drusen, or choroidal lesions. These assessments generally involve evaluation of the macula. For such assessments, target brightness values of between 176 and 208 (e.g., between 184 and 200, between 187 and 197) in a red color channel, between 80 and 112 (e.g., between 88 and 104, between 91 and 101) in a green color channel, and between 16 and 48 (e.g., between 24 and 40, between 27 and 37) in a blue color channel can be used for standardization (e.g., as part of the calibration information). Target contrast values of between 112 and 144 (e.g., between 120 and 136, between 123 and 133) in the red color channel, between 112 and 144 (e.g., between 120 and 136, between 123 and 133) in the green color channel, and between 16 and 48 (e.g., between 24 and 40, between 27 and 37) in the blue color channel can be used.

(iv) Scaling of Brightness and Contrast Values

The absolute brightness and contrast values disclosed herein depend upon the range of available intensity values in each color channel of each pixel. For example, for an image that includes three color channels (e.g., R, G, B), intensities in each of the color channels are generally provided herein on an 8-bit scale, defining an intensity range from 0 to 255.

However, images can be obtained and standardized at other bit depths as well, and it should be understood that when color channel intensities are defined at a bit depth other than 8-bit, the absolute brightness and contrast values disclosed herein remain applicable to those other bit depths as well after they are scaled appropriately. In general, any of the 8-bit intensity values $I_0$ (i.e., target brightness and/or contrast values) disclosed herein can be converted to n-bit values I according to $$I=\text{Int}[(I_0/255)\times(2^n-1)] \quad [5]$$

Thus, for example, for a color channel with a 12-bit range of intensity levels from 0 to 4095, an absolute intensity of 150 at 8-bit depth corresponds to an absolute intensity of 2409, and for a color channel with a 16-bit range of intensity levels from 0 to 65,535, to an absolute intensity of 38,550.

Using Equation (5) above, for standardization of fundus images for diagnosis of retinopathy of prematurity, target brightness values of between 2473 and 2987 (n=12) or between 39,578 and 47,802 (n=16) in the red color channel, target brightness values of between 1895 and 2409 (n=12) or between 29,401 and 38,550 (n=16) in the green color channel, and target brightness values of between 1493 and 2007 (n=12) or between 23,901 and 32,125 (n=16) in the blue color channel can be used. Further, target contrast values of between 3019 and 3533 (n=12) or between 48,316 and 56,540 (n=16) in the red color channel, target contrast values of between 1799 and 2312 (n=12) or between 28,784 and 37,008 (n=16) in the green color channel, and target contrast values of between 642 and 1156 (n=12) or between 10,280 and 18,504 (n=16) in the blue color channel can be used.

The foregoing target brightness and contrast values for diagnosis of retinopathy of prematurity were calculated using Equation (5) with n=12 and n=16, respectively. However, it should be understood that corresponding target brightness and contrast values at any imaging bit depth (i.e., n=2, n=4, n=8, n=10, n=12, n=16, n=24, n=32, n=64, and more generally, n=any positive integer value) are within the scope of this disclosure, and can readily be determined using Equation (5). Furthermore, target brightness and contrast values for image standardization for any of the conditions disclosed herein at different bit depths can be determined using Equation (5). That is, the 8-bit target brightness and contrast values discussed previously for diagnosis of glaucoma, diabetic retinopathy, age-related macular degeneration, drusen, and choroidal lesions can be converted to n-bit values (where n=any positive integer) to standardize fundus or other images obtained at a bit depth of n.

By transforming input images as discussed above, improved output images are obtained that have certain properties that differ from the corresponding input images.

In particular, as discussed above, the transformations applied to an input image yield an output image with corresponding brightness and contrast values that more closely match target brightness and contrast values. Because the selected target brightness and contrast values are specifically selected to aid the human eye in visual diagnosis of a variety of eye diseases and conditions, the output images are typically more useful for diagnostic and display purposes than the input images. As a result, application of the methods disclosed herein yields output images that have been significantly enhanced and improved for particular diagnostic applications, relative to the input images.

In addition to generating and displaying images for diagnostic applications, images and image related information, such as pixel intensity values, can be stored in a variety of different storage devices/units to generate libraries of information. Libraries can include both input (i.e., un-standardized) images and output (i.e., standardized) images, and can be used to provide reference images for subsequent analysis, diagnosis, and derivation of target parameters for standardization.

VI. Imaging and Display Systems

Figure 7:
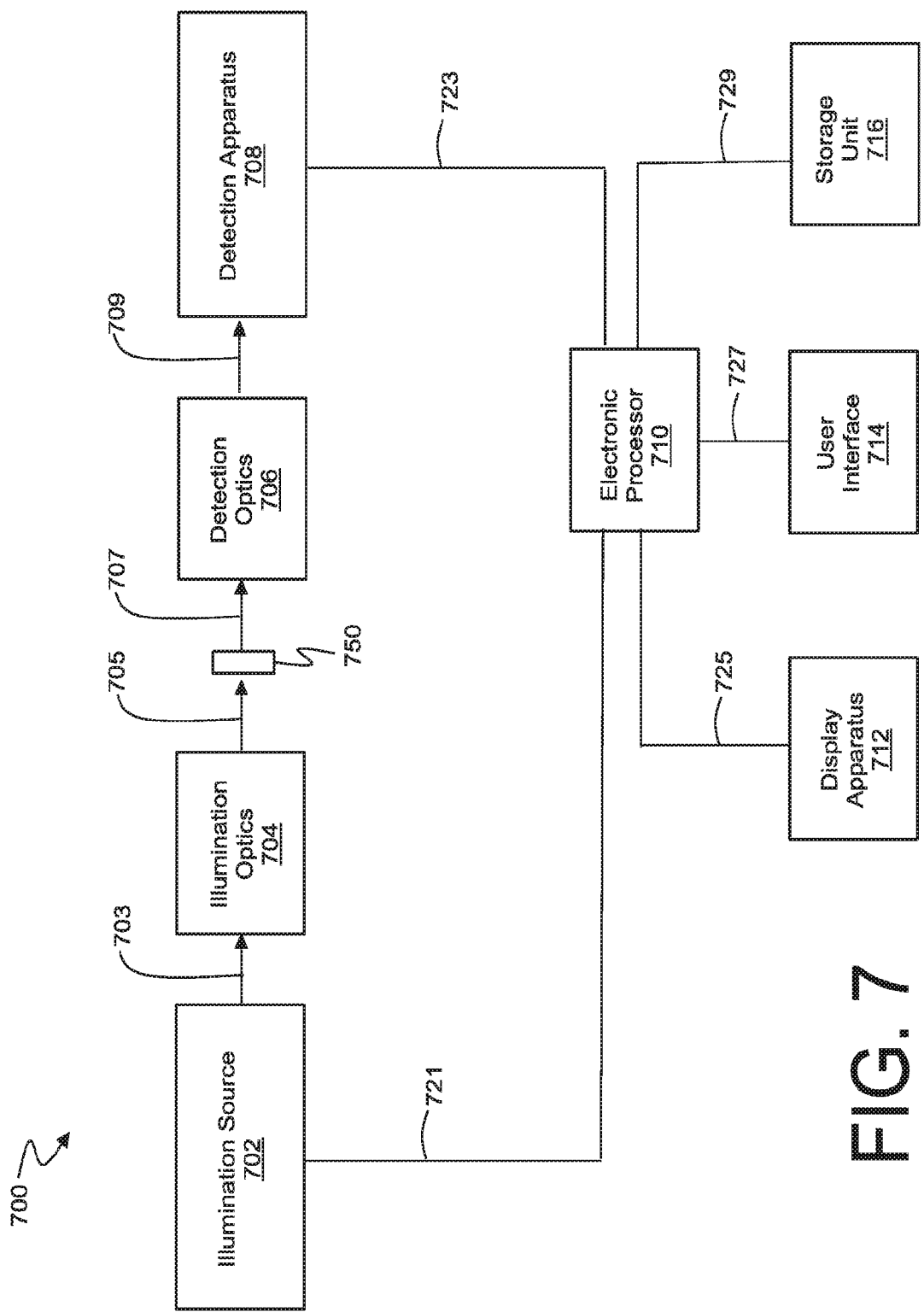
FIG. 7 is a schematic diagram of a system for performing image adjustment and standardization.

Input images of samples can be obtained, adjusted, and standardized using a variety of systems. FIG. 7 is a schematic diagram showing an example of an image adjustment and standardization system 700. System 700 includes an illumination source 702, illumination optics 704, detection optics 706, and a detection apparatus 708. System 700 also includes an electronic processor 710, a display apparatus 712, and a user interface 714. Illumination source 702, detection apparatus 708, display apparatus 712, and user interface 714 are connected to electronic processor 710 via control lines 721, 723, 725, 727, and 729.

During operation, illumination source 702 (optionally under the control of processor 710) generates output radiation 703 which is received by illumination optics 704. Illumination optics 704 transform output radiation 703 into illumination radiation 705, which is incident on sample 750. Emitted radiation 707 emerges from sample 750 and is collected by detection optics 706, which transform emitted radiation 707 into detection radiation 709. Detection radiation 709 is measured by detection apparatus 708, which transmits signals via control line 723 comprising information corresponding to the measured detection radiation 709 (e.g., image signals).

Illumination source 702 can generally correspond to any one or more of a variety of coherent or incoherent sources, including laser sources, fluorescent sources, incandescent sources, LED-based sources, and diode-based sources. Illumination source 702 can be configured to generate output radiation 703 within a variety of different wavelength bands, including ultraviolet, visible, and infrared radiation.

Illumination optics 704 and detection optics 706 can generally include a variety of different optical elements for manipulating the propagation direction, spectral properties, phase properties, polarization properties, and other properties of output radiation 703 (for transformation into illumination radiation 705) and emitted radiation 707 (for transformation into detection radiation 709). Such optical elements include, but are not limited to, mirrors, lenses, beam splitters, filtering elements, waveplates, polarizers, gratings, and other diffractive elements.

Detection apparatus 708 can generally include any one or more of a variety of detectors, including but not limited to CCD-based detectors, CMOS-based detectors, photomultiplier-based detectors, and diode-based detectors. Detection apparatus 708 can also include coupled detectors, including monochromator- and/or spectrometer-coupled CCD and CMOS-based detectors.

In general, emitted light 707 can correspond to a variety of different imaging modalities. For example, in some embodiments, emitted light 707 corresponds to fluorescence and/or phosphorescence emission from sample 705. In certain embodiments, emitted light 707 corresponds to portion of illumination light 705 that is transmitted through, or reflected from, sample 750. In certain embodiments, emitted light 707 corresponds to illumination light 705 scattered by sample 750. Emitted light 707 can be scattered via Brillouin scattering, Raman scattering, or other scattering processes. In some embodiments, emitted light 707 can be generated via nonlinear optical processes occurring in sample 750 in response to illumination light 705, including one or more of two-photon absorption, three-photon absorption, sum-frequency mixing, difference-frequency mixing, and optical parametric generation. In general, emitted light 707—and the imaging modality used to obtain images of sample 750—can correspond to any one or more of a wide variety of different imaging processes, which generate emitted light 707 at multiple wavelengths.

Display apparatus 712 generally includes one or more display screens that are used to display input images obtained by detection apparatus 708 and output images generated by electronic processor 710 as discussed herein. Display apparatus 712 can also be used to display a variety of information, including patient information, calibration settings (such as target brightness and contrast values), diagnostic information associated with input and/or output images, and image acquisition information.

User interface 714 allows a user of system 700 to issue commands and provide information to system 700 (i.e., via processor 710). User interface 714 can be implemented separately from display apparatus 712, or user interface 714 can be integrated into (i.e., displayed on) display apparatus 712. For example, in some embodiments, user interface 714 includes a series of input fields into which a user of system 700 can enter calibration information such as target brightness and/or contrast values associated with particular disease conditions or applications. Processor 710 receives the calibration information and uses it to adjust input images obtained by detection apparatus 708, as discussed above.

In some embodiments, system 700 can also include a storage unit 716 connected to processor 710 via control line 723. Storage unit 716 can be implemented as various forms of tangible storage media, include magnetic media such as hard drives, optical media, flash-based storage media, and read-only persistent media, and can be used to store software instructions that, when executed cause processor 710 to perform the various processing functions and control steps disclosed herein. Storage unit 716 can also store a variety of calibration information, including target brightness and contrast values associated with various diseases and image adjustment applications, for retrieval by processor 710 and use in image standardization operations.

The method steps and procedures described herein can be implemented in hardware or in software, or in a combination of both. In particular, electronic processor 710 can include software and/or hardware instructions to perform any of the methods discussed above. The combination of software and/or hardware instructions ensures that electronic processor 710 is not merely a general processor, but by virtue of its specific configuration, is highly adapted to execute the various method steps disclosed herein.

Moreover, the software and/or hardware instructions that are part of processor 710 result in a significant improvement to processor 710 relative to a general purpose processor. In particular, the specific configuration of processor 710 described herein is such that processor 710 possesses an improved capability to generate output images that are specifically tailored for diagnostic and other applications. As one example, the ability of processor 710 to generate output images for diagnosis of diseases of the eye via visual inspection by a physician is significantly improved relative to the capabilities of a general purpose processor with conventional image processing functionality. Accordingly, the configuration of processor 710 represents a significant technological improvement to the capabilities of conventional electronic processors.

When processor 710 and display apparatus 712 are connected as shown in FIG. 7, these components form a display system for images that is significantly improved relative to conventional display systems. Conventional display systems include, for example, general purpose electronic processors and display units that receive electronic signals from a processor and display pixels illuminated according to information encoded in the electronic signals. When the encoded information corresponds to image information, corresponding images are displayed by the display unit.

However, as discussed above, conventional display systems can be poorly suited for displaying images that are used for diagnostic purposes. In particular, when such systems are used to display images to a physician for purpose of diagnosing conditions/diseases of the eye, the displayed images frequently obscure (or fail to adequately expose) image features that are key to performing an accurate diagnosis.

In contrast, the combination of processor 710 and display apparatus 712 forms a display system that is configured to display diagnostic images according to a specific set of target criteria. Processor 710, as described above, adjusts individual pixel values of the images to correspond to overall target brightness and contrast values that are specifically selected to yield images tailored for diagnosis of particular conditions. Displayed via display apparatus 712, the adjusted output images are significantly more useful for diagnostic purposes than the original unprocessed images.

As a result, the display system represented by the combination of processor 710 and display apparatus 712 represents a significant technological improvement over conventional display technologies and image output systems. By specifically adjusting and displaying output images in a manner than conventional systems do not, the display systems disclosed herein provide physicians with a wealth of diagnostic information that conventional systems may fail to provide. Further, by ensuring that diagnostic images are standardized to a common set of numerical criteria, the display systems disclosed herein permit physicians to analyze information in a consistent manner. Accordingly, the display systems disclosed herein provide a number of advantages that are not typically available in conventional image display systems, and therefore represent a significant technological improvement over such systems.

The methods disclosed herein can be implemented in computer programs using standard programming techniques following the method steps and figures disclosed herein. Program code is applied to input data (e.g., input images) to perform the functions described herein. The output information (e.g., output images) is displayed on display apparatus 712. Output information can also be displayed on a web page or internet site, and/or remote device. Processor 710 and its associated memory can be supplemented by, or incorporated in, ASICs (application-specific integrated circuits).

Each program is preferably implemented in a high level procedural or object oriented programming language to communicate with processor 710. However, programs can be implemented in assembly or machine language, if desired. In any case, the language can be a compiled or interpreted language. Each computer program can be stored on a storage medium or device (e.g., a volatile memory unit and/or non-volatile memory unit connected to processor 710, and/or storage unit 716) readable by the processor, for configuring and operating processor 710 to perform the procedures described herein.

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. A method, comprising:
   obtaining an input image of an imaging subject, wherein the input image is a color image comprising, in each of multiple color channels, a first set of pixel intensity values;
   for each one of the multiple color channels:
      determining a measured contrast value and a measured brightness value from the first set of pixel intensity values for the color channel, wherein the measured brightness value corresponds to an arithmetic mean of the first set of pixel intensity values for the color channel, and wherein the measured contrast value is derived from a distribution of the first set of pixel intensity values for the color channel;
      determining a contrast ratio for the color channel based on a target contrast value for the color channel and the measured contrast value for the color channel; and
      generating a second set of pixel intensity values for the color channel, wherein generating each pixel intensity value in the second set of pixel intensity values comprises scaling a corresponding pixel intensity value from the first set of pixel intensity values according to the contrast ratio for the color channel, and adding to the scaled corresponding pixel intensity value a target brightness value for the color channel; and
   generating, on an electronic display device, an output image of the imaging subject based on the second set of pixel intensity values for each of the multiple color channels,
   wherein in the output image, differences between measured brightness values for each of the color channels and the corresponding target brightness values for each of the color channels are smaller in magnitude than differences between the measured brightness values for each of the color channels from the first set of pixel intensity values and the corresponding target brightness values.

2. The method of claim 1, wherein in the output image, differences between measured contrast values for each of the color channels and the corresponding target contrast values for each of the color channels are smaller in magnitude than differences between the measured contrast values for each of the color channels from the first set of pixel intensity values and the corresponding target contrast values.

3. The method of claim 1, wherein the output image is an image associated with a disease condition, the method further comprising obtaining calibration information associated with the disease condition and comprising the target brightness and contrast values for at least one of the multiple color channels.

4. The method of claim 3, further comprising obtaining the calibration information associated with the disease condition and comprising the target brightness and contrast values by:
(i) obtaining a calibration image comprising information corresponding to the disease condition in the multiple color channels, the information comprising the first set of pixel intensity values;
(ii) for at least some of the multiple color channels in the calibration image:
selecting the target brightness value and the target contrast value for the at least some color channels; and
generating the second set of pixel intensity values from the first set of pixel intensity values;
(iii) generating a calibration output image based on the second set of pixel intensity values; and
(iv) determining whether to include the target brightness value and the target contrast value in the calibration information based on the calibration output image.

5. The method of claim 3, wherein the disease condition comprises retinopathy of prematurity, and wherein the calibration information comprises target brightness values of between 154 and 186 in a red color channel, between 118 and 150 in a green color channel, and between 93 and 125 in a blue color channel, for a range of possible target brightness values of between 0 and 255.

6. The method of claim 5, wherein the calibration information comprises target contrast values of between 188 and 220 in a red color channel, between 112 and 144 in a green color channel, and between 40 and 72 in a blue color channel, for a range of possible target contrast values of between 0 and 255.

7. The method of claim 3, wherein the disease condition comprises glaucoma, and wherein the calibration information comprises target brightness values of between 134 and 166 in a red color channel, between 59 and 91 in a green color channel, and between 21 and 53 in a blue color channel, for a range of possible target brightness values of between 0 and 255.

8. The method of claim 7, wherein the calibration information comprises target contrast values of between 64 and 96 in a red color channel, between 64 and 96 in a green color channel, and between 64 and 96 in a blue color channel, for a range of possible target contrast values of between 0 and 255.

9. The method of claim 3, wherein the disease condition comprises diabetic retinopathy, and wherein the calibration information comprises target brightness values of between 176 and 208 in a red color channel, between 80 and 112 in a green color channel, and between 16 and 48 in a blue color channel, for a range of possible target brightness values of between 0 and 255.

10. The method of claim 9, wherein the calibration information comprises target contrast values of between 112 and 144 in a red color channel, between 112 and 144 in a green color channel, and between 16 and 48 in a blue color channel, for a range of possible target contrast values of between 0 and 255.

11. The method of claim 3, wherein the disease condition comprises age-related macular degeneration, and wherein the calibration information comprises target brightness values of between 176 and 208 in a red color channel, between 80 and 112 in a green color channel, and between 16 and 48 in a blue color channel, for a range of possible target brightness values of between 0 and 255.

12. The method of claim 11, wherein the calibration information comprises target contrast values of between 112 and 144 in a red color channel, between 112 and 144 in a green color channel, and between 16 and 48 in a blue color channel, for a range of possible target contrast values of between 0 and 255.

13. The method of claim 3, wherein the disease condition comprises drusen, and wherein the calibration information comprises target brightness values of between 176 and 208 in a red color channel, between 80 and 112 in a green color channel, and between 16 and 48 in a blue color channel, for a range of possible target brightness values of between 0 and 255.

14. The method of claim 13, wherein the calibration information comprises target contrast values of between 112 and 144 in a red color channel, between 112 and 144 in a green color channel, and between 16 and 48 in a blue color channel, for a range of possible target contrast values of between 0 and 255.

15. The method of claim 3, wherein the disease condition comprises choroidal lesions, and wherein the calibration information comprises target brightness values of between 176 and 208 in a red color channel, between 80 and 112 in a green color channel, and between 16 and 48 in a blue color channel, for a range of possible target brightness values of between 0 and 255.

16. The method of claim 15, wherein the calibration information comprises target contrast values of between 112 and 144 in a red color channel, between 112 and 144 in a green color channel, and between 16 and 48 in a blue color channel, for a range of possible target contrast values of between 0 and 255.

17. The method of claim 1, further comprising, for each one of the color channels, determining the measured contrast value for the color channel based on a standard deviation of the distribution of the first set of pixel intensity values for the color channel.

18. The method of claim 1, wherein, for each one of the color channels, generating each pixel intensity value in the second set of pixel intensity values comprises adding, to the scaled corresponding pixel intensity value, a product of the measured brightness value for the color channel and the contrast ratio.

19. The method of claim 1, wherein in the output image, the magnitudes of the differences between the measured brightness values for each of the color channels and the corresponding target brightness values for each of the color channels are less than 10% of the target brightness values.

20. The method of claim 1, wherein in the output image, the magnitudes of the differences between the measured contrast values for each of the color channels and the corresponding target contrast values for each of the color channels are less than 25% of the target contrast values.

21. The method of claim 1, wherein the imaging subject comprises ocular tissue, the method further comprising diagnosing a disease condition in a patient based on the output image.

22. A system, comprising:
a detection apparatus configured to obtain an input image of an imaging subject, wherein the input image is a color image comprising, in each of multiple color channels, a first set of pixel intensity values;
a display apparatus; and
an electronic processor coupled to the detection apparatus and to the display apparatus, and configured to:
receive the input image;
for each one of the multiple color channels:
determine a measured contrast value and a measured brightness value from the first set of pixel intensity values for the color channel, wherein the measured brightness value corresponds to an arithmetic mean of the first set of pixel intensity values for the color channel, and wherein the measured contrast value is derived from a distribution of the first set of pixel intensity values for the color channel;
determine a contrast ratio for the color channel based on a target contrast value for the color channel and the measured contrast value for the color channel; and
generate a second set of pixel intensity values for the color channel, wherein generating each pixel intensity value in the second set of pixel intensity values comprises scaling a corresponding pixel intensity value from the first set of pixel intensity values according to the contrast ratio for the color channel, and adding to the scaled corresponding pixel intensity value a target brightness value for the color channel; and
generate an output image of the imaging subject on the display apparatus based on the second set of pixel intensity values for each of the multiple color channels,
wherein in the output image, differences between measured brightness values for each of the color channels and the corresponding target brightness values for each of the color channels are smaller in magnitude than differences between the measured brightness values for each of the color channels from the first set of pixel intensity values and the corresponding target brightness values.

23. The system of claim 22, wherein the electronic processor is configured to generate the output image such that differences between measured contrast values for each of the color channels and the corresponding target contrast values for each of the color channels are smaller in magnitude than differences between the measured contrast values for each of the color channels from the first set of pixel intensity values and the corresponding target contrast values.

24. The system of claim 22, wherein the output image is an image associated with a disease condition, and the electronic processor is configured to obtain calibration information associated with the disease condition and comprising the target brightness and contrast values for at least one of the multiple color channels.

25. The system of claim 22, wherein the imaging subject comprises ocular tissue, and wherein the electronic processor is configured to diagnose a disease condition in a patient based on the output image.

26. The system of claim 24, wherein the disease condition comprises retinopathy of prematurity, and wherein the calibration information comprises target brightness values of between 154 and 186 in a red color channel, between 118 and 150 in a green color channel, and between 93 and 125 in a blue color channel, for a range of possible target brightness values of between 0 and 255.

27. The system of claim 26, wherein the calibration information comprises target contrast values of between 188 and 220 in a red color channel, between 112 and 144 in a green color channel, and between 40 and 72 in a blue color channel, for a range of possible target contrast values of between 0 and 255.

28. The system of claim 24, wherein the disease condition comprises glaucoma, and wherein the calibration information comprises target brightness values of between 134 and 166 in a red color channel, between 59 and 91 in a green color channel, and between 21 and 53 in a blue color channel, for a range of possible target brightness values of between 0 and 255.

29. The system of claim 28, wherein the calibration information comprises target contrast values of between 64 and 96 in a red color channel, between 64 and 96 in a green color channel, and between 64 and 96 in a blue color channel, for a range of possible target contrast values of between 0 and 255.

30. The system of claim 24, wherein the disease condition comprises diabetic retinopathy, and wherein the calibration information comprises target brightness values of between 176 and 208 in a red color channel, between 80 and 112 in a green color channel, and between 16 and 48 in a blue color channel, for a range of possible target brightness values of between 0 and 255.

31. The system of claim 30, wherein the calibration information comprises target contrast values of between 112 and 144 in a red color channel, between 112 and 144 in a green color channel, and between 16 and 48 in a blue color channel, for a range of possible target contrast values of between 0 and 255.

32. The system of claim 24, wherein the disease condition comprises age-related macular degeneration, and wherein the calibration information comprises target brightness values of between 176 and 208 in a red color channel, between 80 and 112 in a green color channel, and between 16 and 48 in a blue color channel, for a range of possible target brightness values of between 0 and 255.

33. The system of claim 32, wherein the calibration information comprises target contrast values of between 112 and 144 in a red color channel, between 112 and 144 in a green color channel, and between 16 and 48 in a blue color channel, for a range of possible target contrast values of between 0 and 255.

34. The system of claim 24, wherein the disease condition comprises drusen, and wherein the calibration information comprises target brightness values of between 176 and 208 in a red color channel, between 80 and 112 in a green color channel, and between 16 and 48 in a blue color channel, for a range of possible target brightness values of between 0 and 255.

35. The system of claim 34, wherein the calibration information comprises target contrast values of between 112 and 144 in a red color channel, between 112 and 144 in a green color channel, and between 16 and 48 in a blue color channel, for a range of possible target contrast values of between 0 and 255.

36. The system of claim 24, wherein the disease condition comprises choroidal lesions, and wherein the calibration information comprises target brightness values of between 176 and 208 in a red color channel, between 80 and 112 in a green color channel, and between 16 and 48 in a blue color channel, for a range of possible target brightness values of between 0 and 255.

37. The system of claim 36, wherein the calibration information comprises target contrast values of between 112 and 144 in a red color channel, between 112 and 144 in a green color channel, and between 16 and 48 in a blue color channel, for a range of possible target contrast values of between 0 and 255.

38. The system of claim 22, wherein the electronic processor is configured to determine, for each one of the color channels, the measured contrast value for the color channel based on a standard deviation of the distribution of the first set of pixel intensity values for the color channel.

39. The system of claim 22, wherein the electronic processor is configured to generate, for each one of the color channels, each pixel intensity value in the second set of pixel intensity values by adding, to the scaled corresponding pixel intensity value, a product of the measured brightness value for the color channel and the contrast ratio.

40. The system of claim 22, wherein the electronic processor is configured to generate the output image such that the magnitudes of the differences between the measured brightness values for each of the color channels and the corresponding target brightness values for each of the color channels are less than 10% of the target brightness values.

41. The system of claim 22, wherein the electronic processor is configured to generate the output image such that the magnitudes of the differences between the measured contrast values for each of the color channels and the corresponding target contrast values for each of the color channels are less than 25% of the target contrast values.

42. The system of claim 22, wherein the electronic processor is configured to obtain the calibration information associated with the disease condition and comprising the target brightness and contrast values by:
  (i) obtaining a calibration image comprising information corresponding to the disease condition in the multiple color channels, the information comprising the first set of pixel intensity values;
  (ii) for at least some of the multiple color channels in the calibration image:
    selecting the target brightness value and the target contrast value for the at least some color channels; and
    generating the second set of pixel intensity values from the first set of pixel intensity values;
  (iii) generating a calibration output image based on the second set of pixel intensity values; and
  (iv) determining whether to include the target brightness value and the target contrast value in the calibration information based on the calibration output image.

* * * * *